Oct. 29, 1963  W. D. HAILES  3,109,160
CENTRALIZED TRAFFIC CONTROL SYSTEM FOR RAILROADS
Filed April 17, 1959  16 Sheets-Sheet 1

INVENTOR.
W. D. HAILES
BY
HIS ATTORNEY

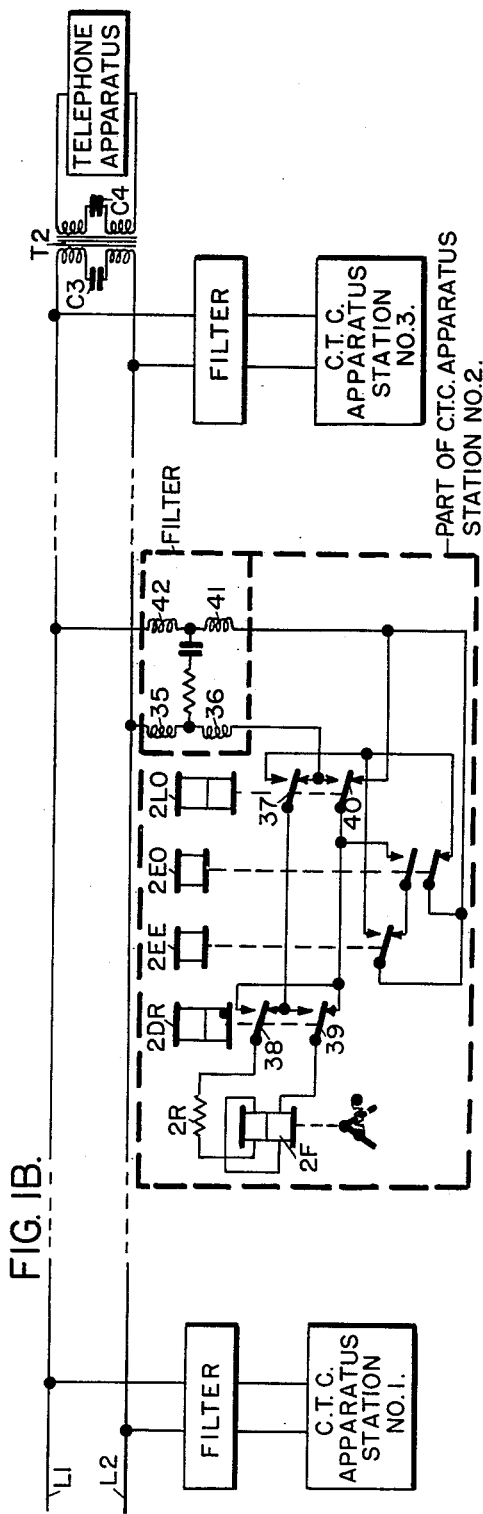

Oct. 29, 1963  W. D. HAILES  3,109,160
CENTRALIZED TRAFFIC CONTROL SYSTEM FOR RAILROADS
Filed April 17, 1959  16 Sheets-Sheet 5

INVENTOR.
W. D. HAILES
BY
Forest B. Whitlock
HIS ATTORNEY

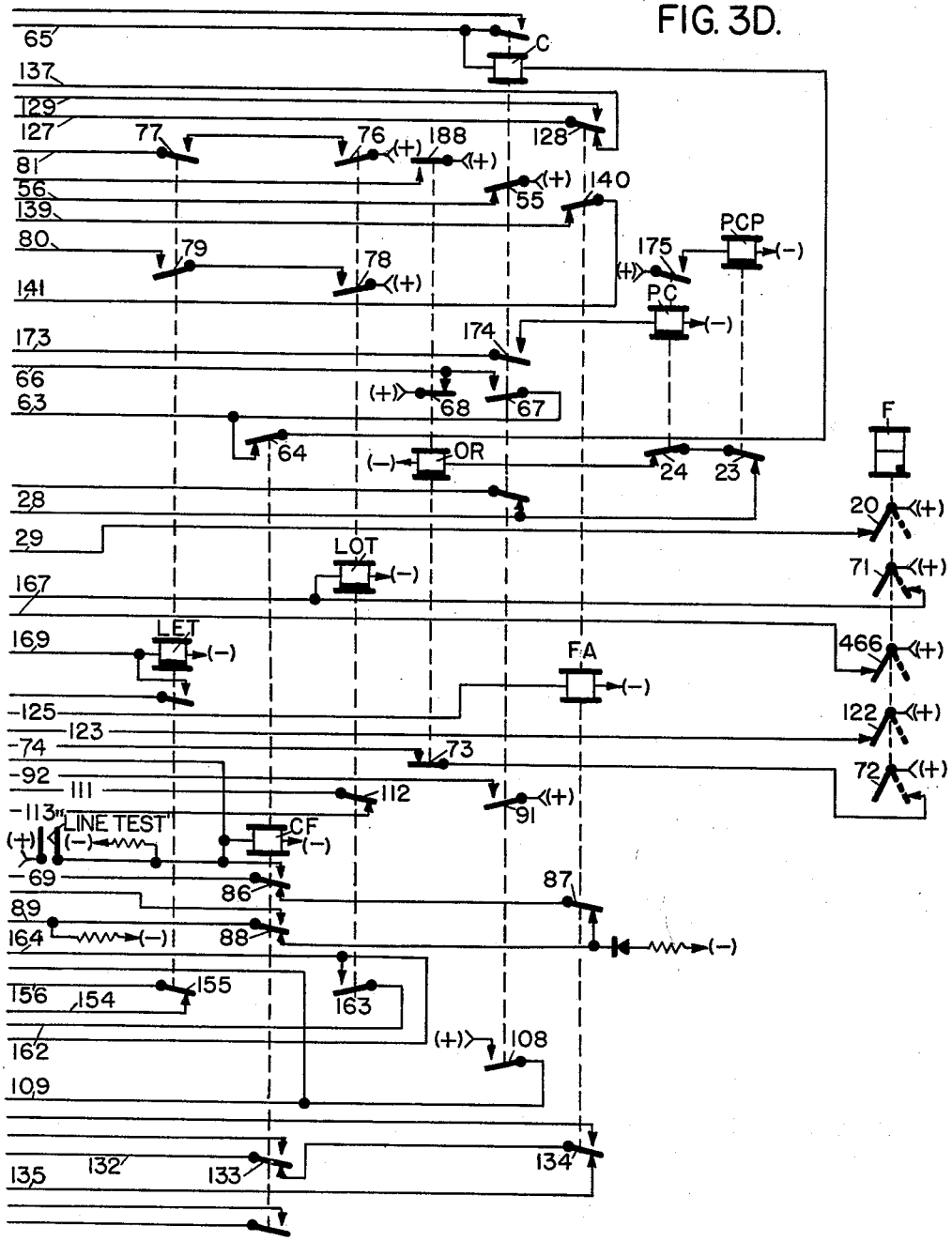

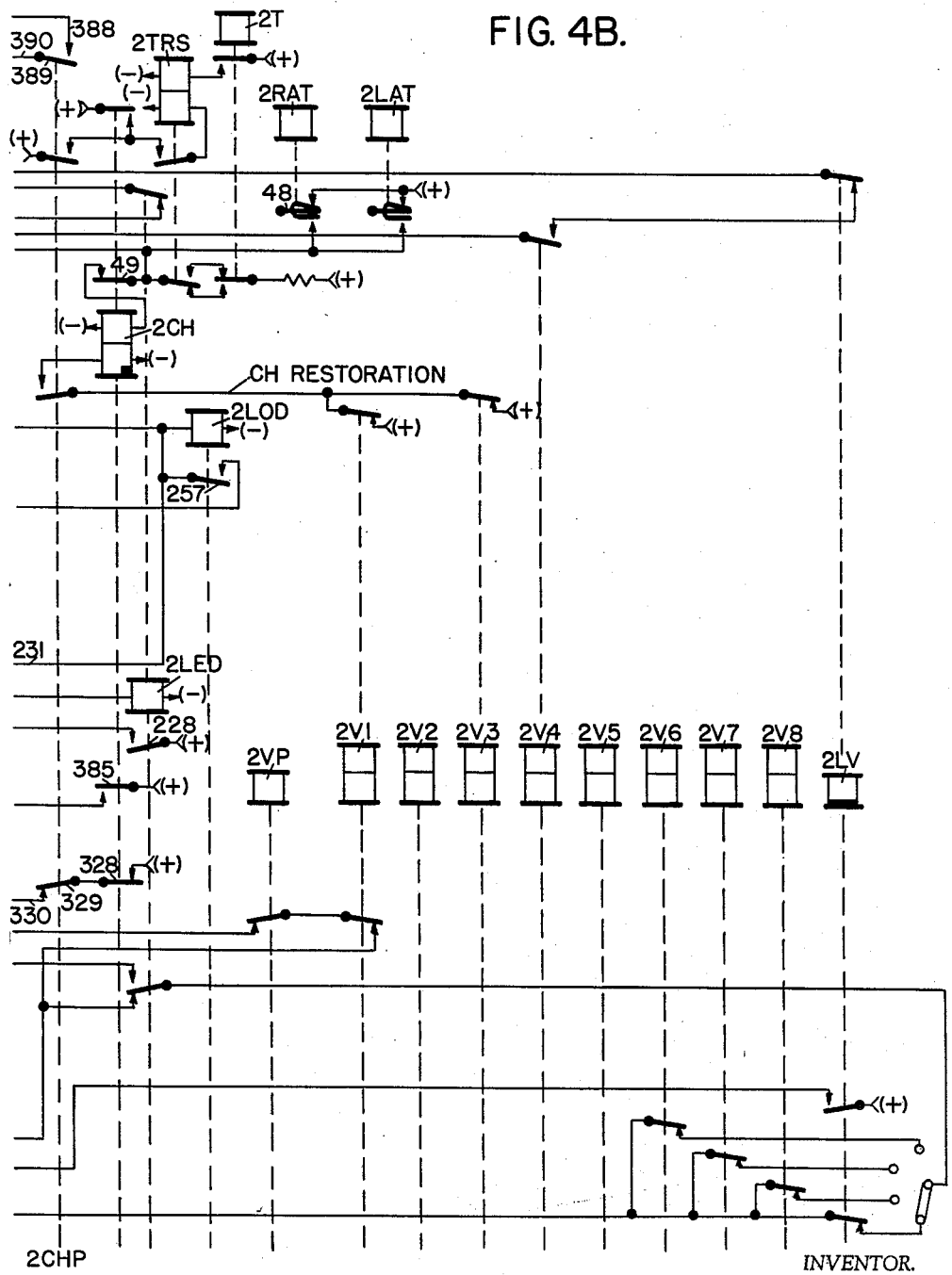

Oct. 29, 1963  W. D. HAILES  3,109,160
CENTRALIZED TRAFFIC CONTROL SYSTEM FOR RAILROADS
Filed April 17, 1959  16 Sheets-Sheet 9

KEY

| FIG. 4A. | FIG. 4B. |
|---|---|
| FIG. 4C. | FIG. 4D. |

INVENTOR.
W. D. HAILES
BY
HIS ATTORNEY

INVENTOR.
W. D. HAILES

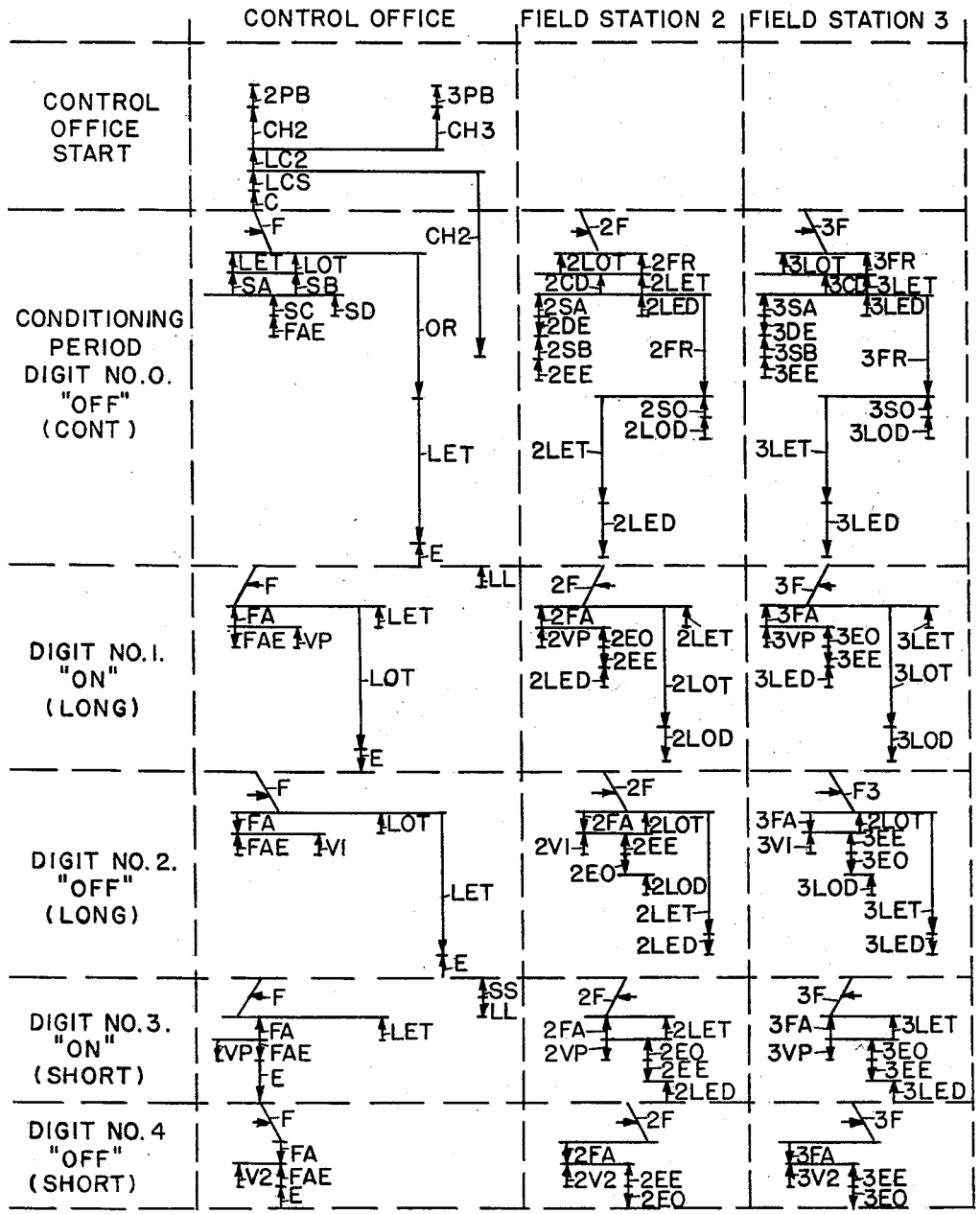

Oct. 29, 1963  W. D. HAILES  3,109,160
CENTRALIZED TRAFFIC CONTROL SYSTEM FOR RAILROADS
Filed April 17, 1959  16 Sheets-Sheet 12

INVENTOR.
W. D. HAILES
BY
HIS ATTORNEY

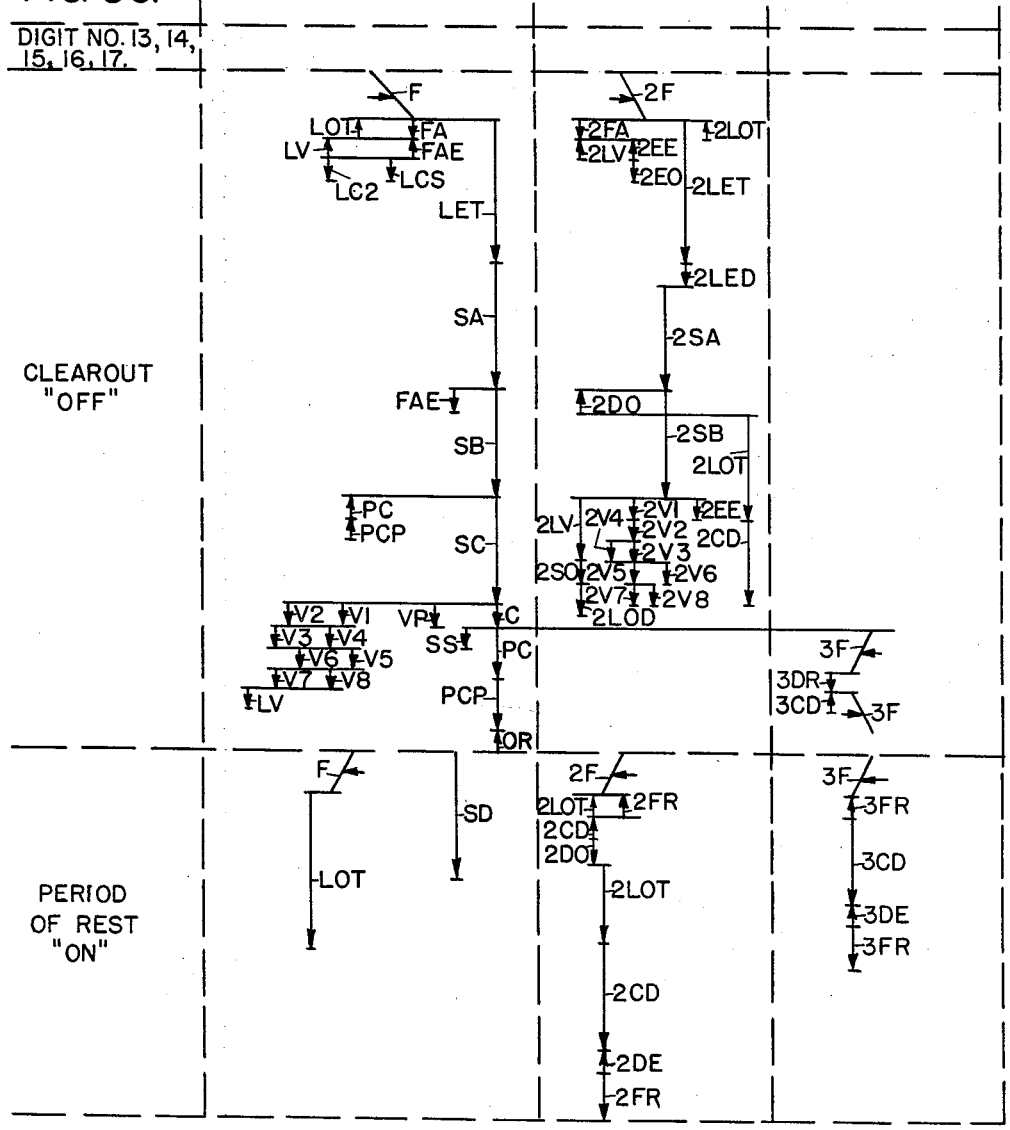

Oct. 29, 1963 W. D. HAILES 3,109,160
CENTRALIZED TRAFFIC CONTROL SYSTEM FOR RAILROADS
Filed April 17, 1959 16 Sheets-Sheet 14

INVENTOR.
W. D. HAILES
BY
HIS ATTORNEY

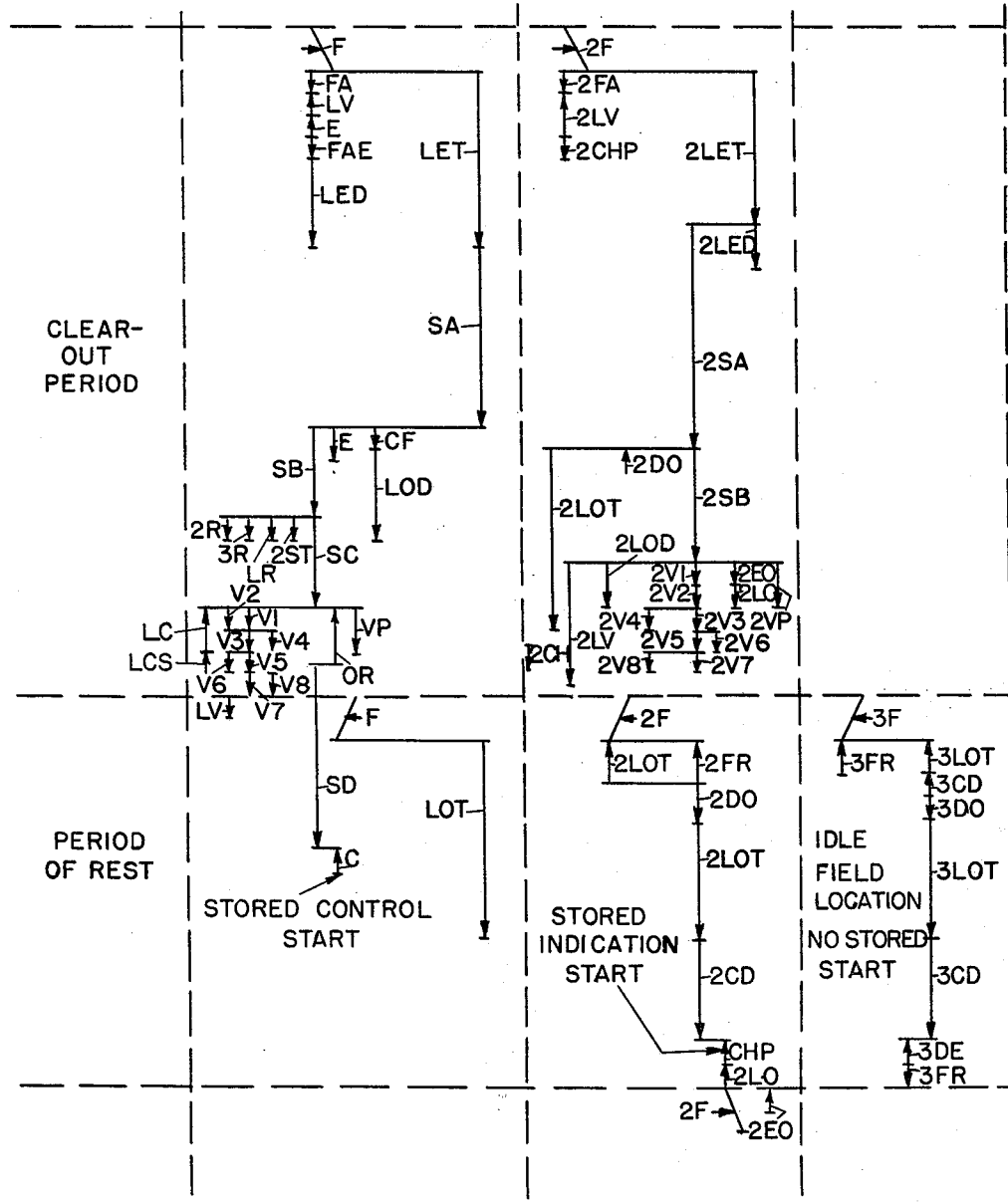

FIG. 7.

INDICATION CODE CHART

| ORDER OF SUPERIORITY | STATION ASSIGNMENT | INDICATION STATION REGISTRATION DIGITS | | | | |
|---|---|---|---|---|---|---|
| | | 1 | 2 | 3 | 4 | 5 |
| 1 | SPARE | S | L | S | L | S |
| 2 | SPARE | S | L | S | S | S |
| 3 | 1 | S | L | L | L | S |
| 4 | 2 | S | L | L | S | S |
| 5 | 3 | S | S | S | L | S |
| 6 | 4 | S | S | S | S | S |
| 7 | 5 | S | S | L | L | S |
| 8 | 6 | S | S | L | S | S |
| 9 | 7 | L | L | S | L | S |
| 10 | 8 | L | L | S | S | S |
| 11 | 9 | L | L | L | L | S |
| 12 | — | L | L | L | S | S |
| 13 | — | L | S | S | L | S |
| 14 | — | L | S | S | S | S |
| 15 | — | L | S | L | L | S |
| 16 | — | L | S | L | S | S |

INVENTOR.
W. D. HAILES
BY
HIS ATTORNEY

United States Patent Office 3,109,160
Patented Oct. 29, 1963

3,109,160
CENTRALIZED TRAFFIC CONTROL SYSTEM
FOR RAILROADS
William D. Hailes, Rochester, N.Y., assignor to General
Signal Corporation, a corporation of New York
Filed Apr. 17, 1959, Ser. No. 807,170
16 Claims. (Cl. 340—163)

This invention relates to communication apparatus for use in centralized traffic controlling systems for railroads, and more particularly relates to the communication portion of the system.

In centralized traffic control systems for railroads, a pair of line wires is employed for transmitting control codes and indication codes between a central control office and one or more outlying field stations to control the traffic governing devices at each of such field stations, as well as indicating the condition of the traffic governing devices to the operator in the central control office.

In a system of this type, a series of electrical impulses forming a control cycle is transmitted over the line wires, the first part of said series of impulses is utilized for the selection of a particular field station and the latter portion of the series is utilized for controlling the position of traffic governing devices at the field station selected by the first part of the series. Similarly, a series of electrical impulses forming an indication cycle is transmitted from a field station over the line wires to the control office to indicate the condition of the traffic governing apparatus at the particular field station. In both instances, the series of impulses which are transmitted either to or from a field station, are arranged to form definite distinct operating cycles. Between successive operating cycles, either for the control of traffic governing apparatus, or for the indication of traffic governing apparatus the code communication system is said to be in a "period of rest." During these "periods of rest" each of the field stations must be in readiness either to receive a control code cycle from the control office or to transmit an indication code cycle from its respective field station.

According to the present practice a line relay is provided at the control office and a field line relay is provided at each of the field stations which are responsive to the respective movements of each other. In other words, the field line relay at each field station follows the movement of the control office line relay during a control code cycle and the control office line relay follows the movement of a respective field station line relay during an indication cycle. In present practice, the line relays at the control office and field station are normally energized and the transmission of a code cycle is commenced by the momentary movement of the control office line relay to its deenergized or "off" position. According to present practice, when a control cycle is initiated at the control office, all of the field line relays respond in synchronism to the movement of the line relay at the control office. The particular field station, which is to be controlled, is selected during the first portion of said control cycle and the execution or function relays for governing the position of the apparatus at the selected field station are then operated. However, according to present practice, the relays which comprise the means for starting, conditioning, stepping, and clearing out a particular control code cycle are operated at all of the field stations in response to the movement of the line relay at the control office regardless of whether or not the traffic governing apparatus at the field station is selected to be controlled.

Also, in code communication systems now employed, the operation of the communication apparatus during an indication cycle, wherein a particular field location acts as a transmitter in response to a change in the condition of its associated traffic governing apparatus, certain field station coding relays which are associated with the non-transmitting or idle field locations remain energized after the non-transmitting field station has been locked out or rejected.

Furthermore, in accordance with present practice certain coding relays associated with each field station remain energized during a "period of rest" when no code cycles are being transmitted so that the field station will be responsive to the initiation of a code cycle which is manifested by the movement of a particular line relay.

In code communication systems presently in operation, a broken or shorted line wire causes one or more field line relays to assume a deenergized or "off" position, which condition results in the energizing of certain coding relays during the time that the abnormal line wire condition prevails.

In accordance with present practice, each one of the above stated conditions results in the code communication relays being needlessly energized and needlessly operated under certain circumstances. This condition results in the excessive use of electrical energy at each field station; and also needlessly operates certain relays, thereby shortening their useful life or maximizing their chances for failure.

It is desirable in code communication installations where the only energy available at the field locations is from primary batteries, or where field locations are equipped with storage batteries charged from commercial power lines, and under other conditions where it is desirable to conserve electrical energy, that the code communication be so constructed and arranged that the de-energized condition of its associated relays taken collectively consumes minimum wattage when they are serving no useful function. However, it is necessary at the same time to insure that the field stations will be immediately responsive to a code cycle while still maintaining the all important fail-safe principle of railway communication systems.

The present invention is disclosed as being applied to a code communication system, and is an improvement over the type shown in the patent to Hailes et al., No. 2,399,734, and the type disclosed in a publication entitled "GRS Centralized Traffic Control Handbook 45," dated October 19, 1955, and copyrighted 1955, wherein a code communication is disclosed which is simplex in operation, that is, the line circuit can transmit only one control code cycle or one indication code cycle at a time. The code system provided herein is of the type wherein a series of long and short "on" periods, and long and short "off" periods, in the form of different series of electrical impulses and time spaces with each impulse together with the time space following such impulse constitutes a step period in the code cycle. Generally this invention is shown as being applied to a time space code communication system which is well known in the prior art. However, it is to be understood that this invention may be applied to other modifications of railway code communication apparatus. It is further understood, that the system herein disclosed, is for the control of power switches and signals, and an indication of their respective positions; however, the control apparatus for directly controlling the respective switches and signals and their indications form no part of the present invention and it is considered necessary to show only those portions of the railway signaling apparatus at a field station which is directly related to the code communication system which constitutes the embodiment of this invention.

In the present invention, each series of impulses and time spaces, transmitted from the control office is to constitute a control cycle; and each series of "non-shunt"

and "shunt" periods transmitted from a respective field station is to constitute an indication cycle. Each control and indication cycle is initiated from a "period of rest" during which the line circuit is normally energized with a particular polarity into a conditioning period. The conditioning period of the cycle which is an "off" period in the case of a control cycle or a "shunt" period in the case of an indication cycle, is for the purpose of conditioning the various relays associated with the code communication apparatus for the transmission of respective control or indication codes. During a control cycle, the periods following the conditioning period are numbered consecutively as digits, the odd number digits being the "on" periods and the even numbered digits being the "off" periods. Similarly during an indication cycle the periods following the conditioning period are numbered consecutively as digits, the odd number digits being "non-shunt" periods and the even numbered digits being "shunt" periods. Following each series of control or indication digits in a particular code cycle is a "clear-out" period which serves to further condition various coding relays in a manner which will be described in detail as the description of the invention progresses. In a control cycle the "clear-out" period is an "off" period, and in an indication cycle the "clear-out" period is a "shunt" period.

In view of the foregoing, one of the objects of this invention is to provide an improved code communication system in which all of the coding relays in every field station are disconnected from battery energy during a "period of rest."

Another object of this invention is to provide an improved code communication system having improved means for rendering a field station unresponsive to a control code cycle after the particular field station has been rejected by the station selection portion of the transmitted control code.

A further object of this invention is to provide a code communication system having a circuit means for disconnecting all the field station coding relays from electrical energy at a particular field station in response to the prolonged deenergization of its associated field line relay.

A still further object of this invention is to provide a code communication system capable of transmitting cycles of distinctive codes having so called "periods of rest" between each cycle, with a circuit means for conditioning the code communication relays at a field station and subsequently disconnecting said code communication relays from battery energy, said relays being responsive to a subsequent control cycle.

A further object of this invention is to provide a code communication system having means for disconnecting electrical energy from the coding relays of all non-transmitting field stations during an indication cycle.

A still further object of this invention is to provide a code communication system having a means for rendering a field station previously rejected during a control cycle responsive to further movements of a control office line relay during the "clear-out period" of a control cycle.

Other objects, characteristics and features of the present invention will be in part obvious from the accompanying drawings and in part pointed out as the description of the invention progresses.

For the purpose of simplifying the illustrations and facilitating in the explanation thereof, the various parts and circuits constituting this embodiment of the present invention have been shown diagrammatically and certain conventional illustrations have been employed. The drawings have been made more for the purpose of facilitating in the disclosure of the principles and manner of operation of the invention, rather than for the purpose of illustrating the specific details and arrangements of parts that would be employed in practice. Symbols are used to indicate the connections to the terminals of batteries or other sources of energy instead of showing all of the wire connections to said terminal. The symbols (+) and (—) are employed to indicate the positive and negative terminals respectively of suitable batteries or other sources of direct current. In order to simplify the disclosure of the present invention, reference is made in certain instances, to functions common to all parts and having a certain character reference without preceding or succeeding numerals. It is to be understood that such a reference applies to any parts designated in the drawings by reference characters that are similar except for numerals associated therewith.

In describing the invention in detail, reference will be made to the accompanying drawings in which like reference characters designate corresponding parts throughout the drawings, certain reference characters being employed to designate parts of a similar nature, such parts being generally identified as being with one particular location, device, or sequence of operation by preceding or succeeding numerals, and in which:

FIGS. 1A and 1B when placed end-to-end illustrate the line circuit for this embodiment for this present invention;

FIG. 2 is a code chart showing the typical codes used in this embodiment of the present invention for the transmission of controls to the various field stations from the control office;

FIGS. 3A, 3B, 3C and 3D when placed side by side illustrate the control office apparatus for the transmission of controls according to this embodiment of the present invention;

FIGS. 4A, 4B, 4C and 4D illustrate the apparatus for receiving controls and transmitting indications at a field station according to this embodiment of the present invention;

FIG. 4E is a key plan showing how circuit drawings 4A–4D must be arranged in relation to each other;

Figure 5B:
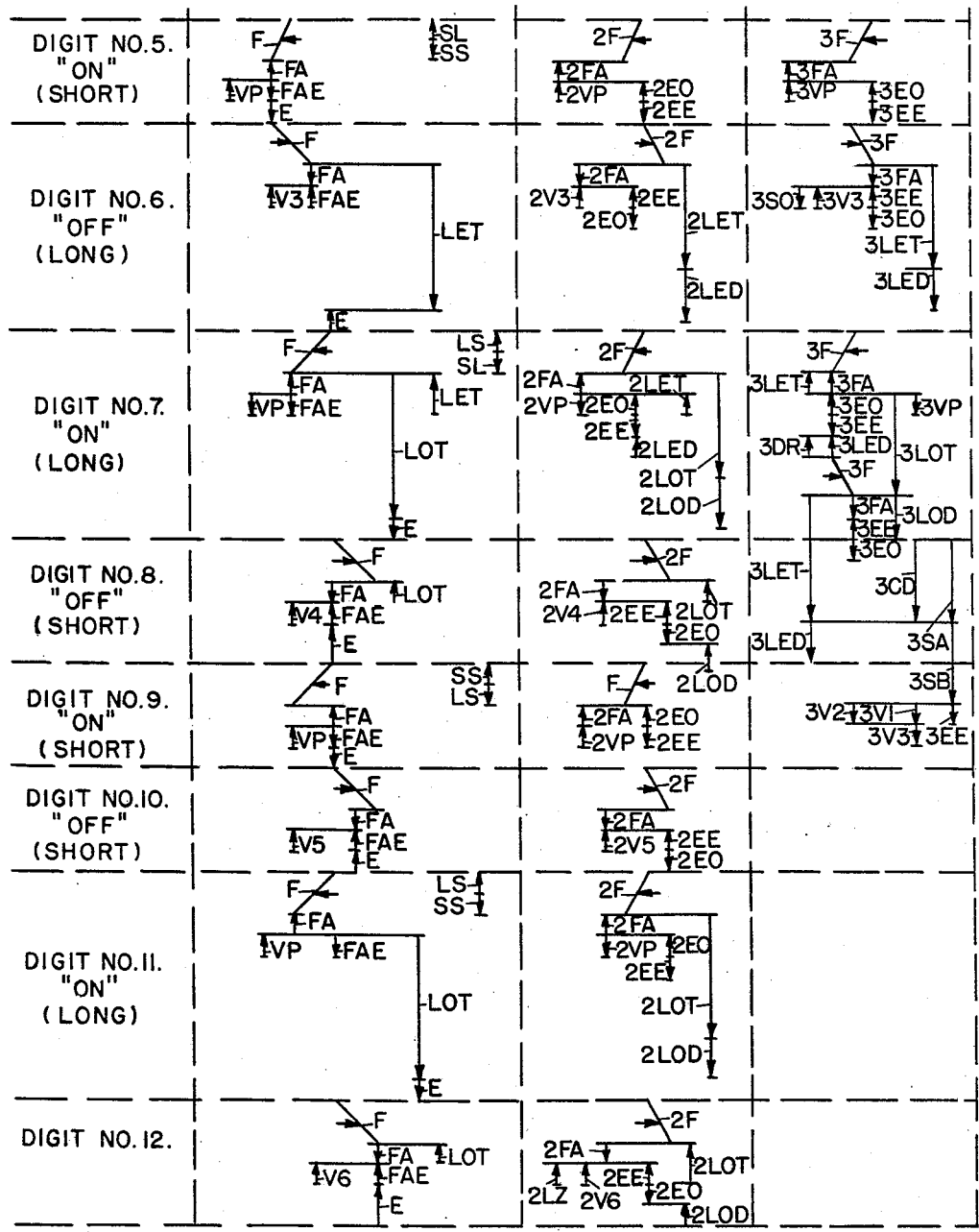
Figure 6A:
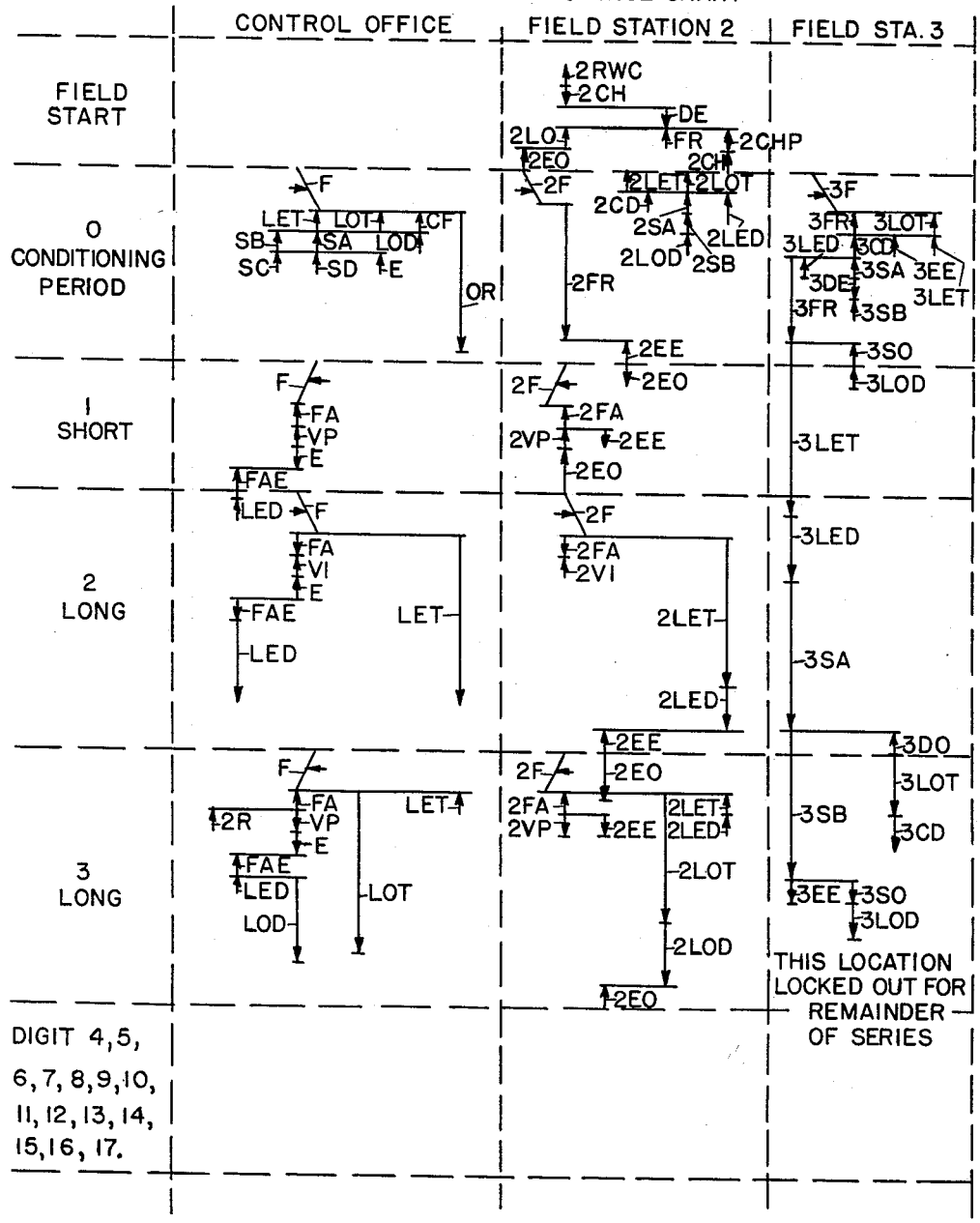

FIGS. 5A, 5B and 5C when placed one above the other form a control cycle sequence chart showing the sequence of operation of the relays during the transmission of a control cycle;

FIGS. 6A and 6B when placed one above the other form an indication cycle sequence chart which illustrates the sequence of operation of the relays of the system during the transmission of an indication cycle; and FIG. 7 presents an indication code chart for a typical sixteen station system.

CONTROL OFFICE APPARATUS

Figure 3A:
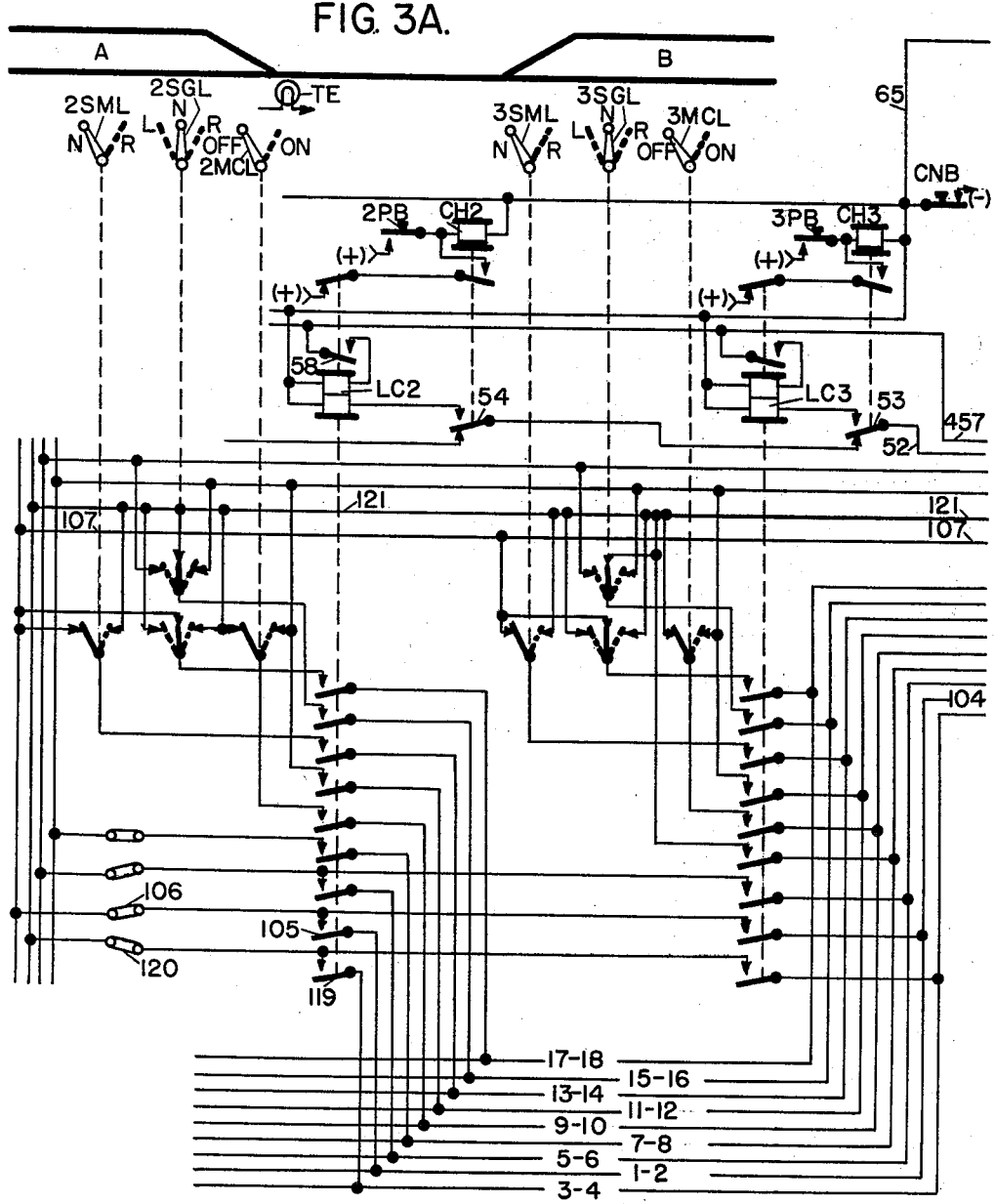
Figure 3B:
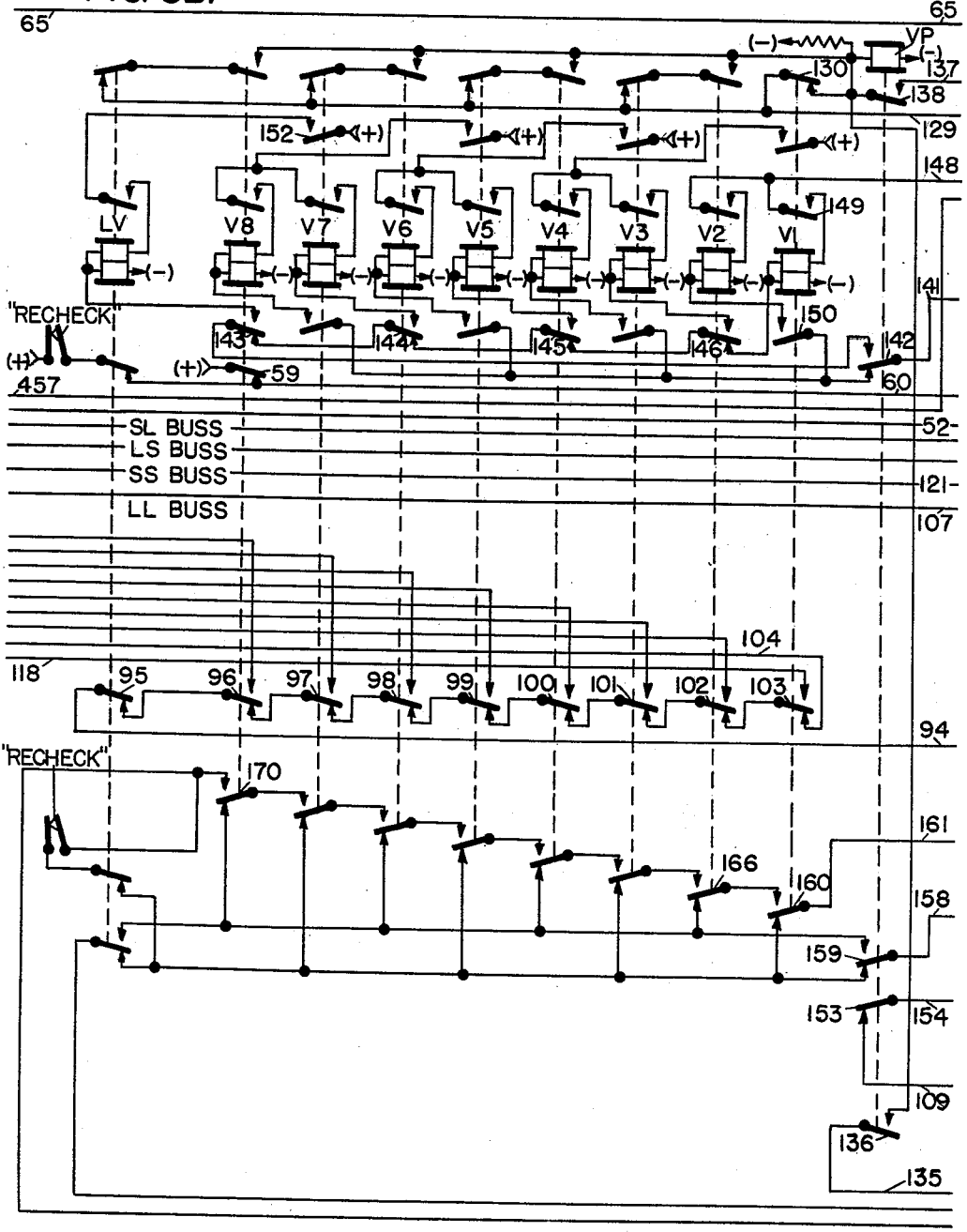

Referring to FIGS. 3A to 3D the control office apparatus is diagrammatically illustrated. In FIG. 3A various buttons and control levers are provided on a conventional control panel in the usual manner for the manual designation of switch and signal controls to be communicated to the respective field stations. For example, the levers 2SML, 2SGL and 2MCL are associated with the selection of controls to be transmitted to field station No. 2. Similarly the levers 3SML, 3SGL and 3MCL are associated with the selection of controls to be transmitted to field station No. 3. The lever SML is a two-position lever for selecting the position of a power operated switch machine at that field station, the lever SGL is for the purpose of selecting the control of the signals at the field station as to whether a signal is to be cleared for governing eastbound or westbound traffic or whether a signal is to be put to stop. The normal position of the lever SGL, which corresponds to the stop indications of signals for both directions, is its center position, and the operation of the lever to a right hand or left hand position selects the clearing of a signal governing traffic to the right or to the left respectively. The maintainer call lever MCL is a two-position lever normally maintained in its left hand position which can be operated to its "call" or right hand position when it is desired to transmit a maintainer call control to a respective field station.

Associated with initiating the cycles of operation for the transmission of controls to the various field stations are start buttons PB, change relays CH, and code determining relays LC, one of each being provided for each field station. A stick relay LCS (see FIG. 3C) is responsive to the picking up of relay LC for any field station, and the picking up of such relay prevents the picking up of other LC relays until the termination of the control cycle which has been initiated.

Referring to FIG. 3D, a relay C is responsive to the picking up of a relay LCS for the initiation of the system into a control cycle from a state of rest, and such relay is maintained picked up throughout the cycle.

Relays OR, SA, SB, SC and SD (see FIGS. 3C and 3D) are slow acting relays, the relay OR being an "office rest" relay which is picked up during the clear-out period and remains energized during a period of rest, and deenergized during the control or indication cycle, and the relays SA, SB, SC, and SD being cycle marking relays which are picked up and remain picked up throughout each cycle of operation of the code communication system. A pole changing relay PC and pole changing repeater relay PCP are energized in the "clear-out" period of the cycle for purposes which will be more fully explained.

A two-position polar magnetic stick type relay F (see FIGS. 3D and 1A) is provided at the control office. The relay F has windings for local impulse energization by a transformer T3 over its secondary winding 19. During an indication cycle, the relay F is operated in response to a change from the "shunt" to "non-shunt" conditions of the line circuit or vice versa; and during a control cycle the relay F is positioned by a change in local energization. A relay FA acts as a repeater of relay F during each cycle of operation and is energized during the "on" or "non-shunt" periods of the cycle. Relay E (see FIG. 3C) is a code transmitter relay for closing and opening the line circuit to create "on" and "off" periods during a control cycle.

The relay FAE (see FIG. 3C) is an inverse repeater of the FA relay during a control cycle and it is an inverse repeater of the E relay in an indication cycle.

The long digit timing relays LET and LOT produce the long even and long odd digits respectively in control cycles and a prolonged release in any cycle deenergizes the slow release relay SA which will reveal that the digit is abnormally long and thus clears out the system. The relays LL, SS, SL and LS are code determining relays which serve to determine the length of the digits to be transmitted during a control cycle. For example, the LL relay is energized for determining that two long digits will be transmitted in succession. The SS relay determines that two short digits will be transmitted in succession during a cycle. The SL relay determines that a short digit will be followed by a long digit, and the LS relay determines that a long digit will be followed by a short digit. Only one of these code determining relays can be picked up in any given step, said step comprising an odd and an even digit. The stepping relays V1, V2, V3, V4, V5, V6, V7, V8 and LV apply the control code during a control cycle to a field station as determined by the LC relay. The stepping relays apply the control code one digit at a time in succession. The relay VP is a step advance repeater relay which serves to shift the pick-up circuit for the stepping relays V so that they pick up successively in an orderly progression. The VP relay also permits but one stepping relay to be picked up at any one time, and checks that a previous stepping relay has picked up before advancing the pick-up circuit through a succeeding stepping relay.

The relays LET and LOT are slow in dropping away for timing the length of the respective even and odd digits, the "even" digits being "off" periods during a control cycle and "shunt" periods during an indication cycle, and the "odd" digits being "on" periods during a control cycle and "non-shunt" periods during an indication cycle.

That portion of the control office apparatus in the code communication system, which serves to receive an indication code from a respective transmitting field station forms no part of this invention and reference is made to the aforementioned Hailes et al. Pat. No. 2,399,734 for a more complete detailed description thereof.

*Line Circuit*

Figure 1A:
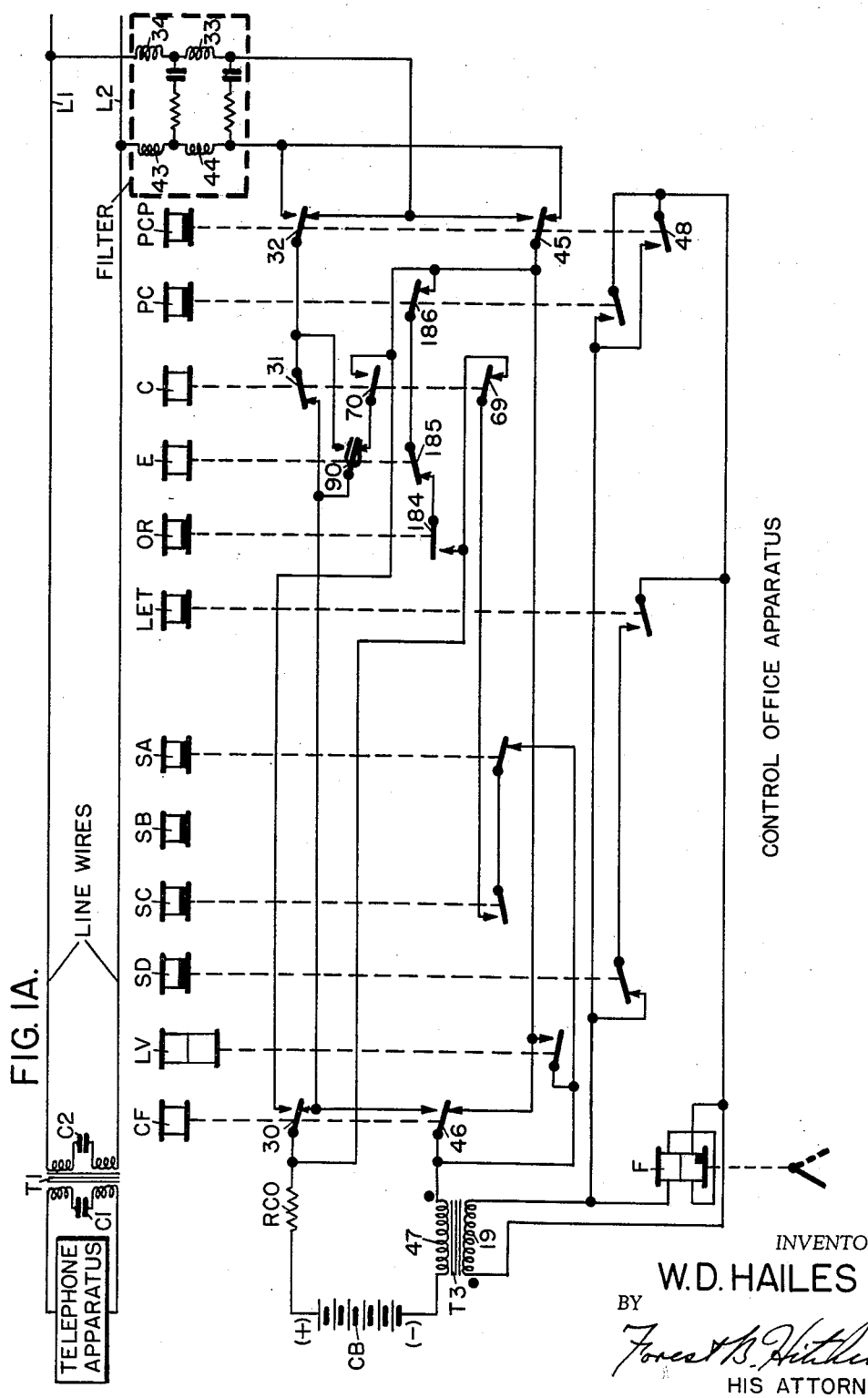

Referring to FIGS. 1A and 1B, the line circuit used in this embodiment of the present invention comprises the line wires L1 and L2 extending from the control office to the various field stations. The opposite ends of the line wires L1 and L2 are indicated as being coupled by suitable transformers T1 and T2 to telephone apparatus. To prevent a direct current shunt of the line circuit through the windings of the transformers suitable condensers C1 through C4 are connected in series with the windings of the transformers.

The line circuit for the centralized traffic control system of the present invention is normally energized from the control office so that any field station may initiate the system into operation and transmit indications by shunting and unshunting the line circuit at its locations. For the transmission of controls the line circuit is governed by the control office apparatus in such manner that different series of direct current code impulses are applied thereto. The direct current apparatus of the CTC system both at the control office and at the several field stations is connected across the line wires through suitable filter devices which restrict the flow of alternating current into this portion of the system from the telephone communication portion of the line circuit. It will be readily seen from FIGS. 1A and 1B that a direct current pulse may be applied to the line circuit from the control battery CB, which will flow over the line wires L1 and L2, to energize the direct current field line relays F at the several field stations. In order to facilitate in the description of the operation of the system, the application of positive energy to line wire L1 from the battery CB is said to positively energize the line circuit, and the application of negative energy to the line wire L1 is said to negatively energize the line circuit.

With reference to FIG. 1A, it will be seen that the primary winding 47 of the transformer T3 is connected in series with the battery CB across the line wires L1 and L2. Therefore, the shunting of the line circuit at any field station causes an increase in the current passing through the primary winding of the transformer T3. In response to this increase of current a pulse of energy in the secondary winding 19 of the transformer T3 actuates the polar relay F in the control office to its right hand position.

*Field Station Apparatus*

At each of the field stations, relays F, FA, SA, SB and LOT (see FIGS. 4A–4D) are of the same general character and have the same general functions as the relays which have been described having similar letter reference characters as being provided at the control office. Such relays are readily identified as to the particular field station at which they are associated with preceding numerals.

The relays LED and LOD are long digit detecting relays which release during long even and long odd digits respectively. In control cycles the position of these relays determines the polarity of the energy applied to the function controlled relays (not shown). In indication cycles the relays LED and LOD are repeaters of the LET and LOT relays, respectively, assisting in producing long digits for transmission. A CH indication change storage relay is provided for each field station. The CH relay is a magnetic stick relay which is held in a closed position by a permanent magnet, and is provided with a knock-down winding which serves to neutralize the flux of the permanent magnet to drive the relay to an open position in response to a change in the traffic governing apparatus at a particular field station. The CHP is a change repeater relay which serves to initiate an indication start and stores this start, if another cycle is already in progress. The slow release relay CD is a cycle distribution relay which is picked up in the conditioning period of a cycle and is supported during a cycle by the released condition of the relay FR. The CD relay prevents a station from initiating a second indication cycle in the same series and also shortens the rest period of a non-receiving station during a control cycle so that it will be first to respond to a stored start, should any be present. The LO relay (see FIGS. 4A and 1B) is provided to convert a field location from a receiver to a transmitter, and pole changes the connections between the field station line relay F and the line L1 and L2. The field rest relay FR is momentarily energized during a period of rest and is thereafter deenergized in the same period of rest, which operation conditions other field station relays as will be more fully described.

The relay DE is a disconnect energy relay, which is a magnetic stick relay having two windings, a pick-up winding and a knock-down winding. Once the relay is picked up, it is held picked up by a permanent magnet. When the knock-down winding is energized the magnetic flux opposes the flux of the permanent magnet and the relay releases. The DE relay is provided to disconnect the battery energy from the coding relays at a field location when the system is at rest.

The relay DO is an energy removal indication relay, which is a magnetic stick relay having a winding for energizing, and a winding for knocking down the relay after it is energized similar to the relay DE. The relay DO is provided to disconnect the coding relays from battery energy at non-transmitting field stations during idle indication cycles. The relay DR is a reverse connection relay of the magnetic stick type similar to relays DO and DE, which is picked up when a field location is rejected. During a control cycle this relay DR serves to reverse the connections of the line wires to a rejected field station line relay F, to render the field station line relay F unresponsive to further movements of the control office line relay F. The particular function of this relay will be more fully described as the description of the invention progresses. During a "clear out" period the DR relay is energized to an open or down position in response to the operation of the field station line relay F which operation will be more fully described hereinafter.

The relays EE and EO are line shunting relays which release the indication code digits one by one. The EO relay applies a shunt to the line and the EE relay removes the shunt on the line. The EO relay ends an odd digit and the EE relay ends an even digit.

The stepping relays V1, V2, V3, V4, V5, V6, V7 and V8 transfer the control code during a control cycle to the station selection relays and the function control relays (not shown). During an indication cycle the V relays apply local energy to the EE and EO relays which in turn transmit the indication code. A VP step advance repeater relay serves to shift the pick-up circuit for the step relays so that they pick up in orderly progression. The VP relay allows one step relay to pick up at a time and checks that the previous stepping relay has picked up before advancing the pick-up circuit to the succeeding stepping relay.

The relay TRS is a track occupancy storage relay and the relays RAT and LAT are right and left approach track occupancy relays which commence an indication cycle under certain conditions.

Having thus described the general organization of the apparatus employed in this embodiment of the present invention and the functions of the various relays in the control office and the respective field stations, a more detailed description of the communication system will be described with respect to its mode of operation.

OPERATION

The communication system provided by the present invention is normally "in a period of rest" from which it can be initiated into a cycle of operation for the transmission of controls from the control office to the field stations, or initiated into a cycle of operation for transmitting indications from the respective field stations to the control office.

Upon the initiation of the system at the beginning of a cycle, the system enters a conditioning period which is called an "off" period if the control office is transmitting, or a "shunt" period if a field station is transmitting. The conditioning period is long when the control office is transmitting, and is short when the field station is transmitting. Therefore, the control office can overcome and take precedence over a simultaneous field station start for the transmission of a control cycle.

With reference to the code chart shown in FIG. 2 it will be noted that the codes for a control cycle consist of step periods which have their respective "on" and "off" periods either long and short, respectively, or short and long, respectively, each step period is characterized in either of those two ways. According to the present embodiment, the first four steps in a control cycle are used for station selection and the remaining group of step periods are used for the transmission of controls to the particular field station selected during the first four step periods of the cycle.

After the last "on" period of a control cycle or after the last "nonshunt" period of an indication cycle, the system enters a clear-out period during which the apparatus at the control office and the various field stations are put into a cleared-out condition. After the clear-out period of a particular cycle, the system enters a "period of rest" from which it can be initiated into either a control or an indication cycle.

NORMAL-AT-REST CONDITIONS

When the system is normally "in a period of rest" the line wire L1 is maintained energized with a positive polarity (see FIGS. 1A and 1B) to allow any field station to transmit the start of an indication cycle by the application of a shunt across the line wires in the vicinity of the field station which desires to initiate said indication cycle.

At the control office, the office rest relay OR (see FIG. 3D) is normally energized by a circuit extending from (+) and including contact 20 of line relay F in its left-hand position wire 29, back contact 21 of relay SB, limiting resistor 22, wire 28, back contact 23 of relay PCP, back contact 24 of relay PC, and the winding of relay OR, to (—). Relay OR may also be energized by an alternate energizing circuit which extends from (+) and includes back contact 25 of relay SB, front contact 26 of relay SD, back contact 27 of relay SC, wire 28, back contacts 23 and 24 of relays PCP and PC respectively, and the winding of relay OR to (—).

When the relay OR is energized, the positive terminal of battery CB (see FIG. 1A) is connected to the line wire L1 through low resistance limiting resistor RCO, back contact 30 of relay CF, back contact 31 of relay C, back contact 32 of relay PCP, and line filter windings 33 and 34. With the line wires energized in this condition the relays F at the respective field stations are energized by the line circuit so as to cause their polar contacts to be actuated to left-hand positions. The relay 2F (see FIG. 1B), for example is energized during a period of rest by a circuit which extends from the line wire L1 through filter windings 42 and 41, back contact 40 of relay 2LO, back contact 39 of relay 2DR, the lower and upper windings respectively of relay 2F, resistor 2R, back contact 38 of relay 2DR, back contact 37 of relay 2LO, filter windings 36 and 35, line wire L2, filter windings 43 and 44, back contact 45 of relay PCP, back contact 46 of relay CF, primary winding 47 of transformer T3 and the (—) terminal of battery CB.

At each of the field stations a change relay CH is normally in its picked up position having been so positioned by current flowing in its lower winding from left to right and is held in such position by a permanent magnet (see FIG. 4B). The relays RAT and LAT and the relay TRS are operated in response to a change in traffic conditions in the vicinity of an associated field station. When the relay 2RAT, for example, is dropped away, a circuit is completed for energizing the upper winding by current flowing from right to left in relay 2CH which extends from (+) and includes back contact 48 of the make before break contact of relay 2RAT, front contact 49 of relay 2CH and the upper winding of relay 2CH to (—). The reversed current flow in the upper winding with respect to the lower overcomes the flux of the permanent magnet holding the armature in a stick position causing the armature to release. It is evident from FIG. 4B that other traffic condition relays can at times cause the relay 2CH to be driven to a deenergized position by the completion of obvious circuits. The driving down of relay 2CH initiates an indication cycle which will be described in detail as the description of the invention progresses.

CONTROL OFFICE START

Referring to FIGS. 3A–3D and FIGS. 5A–5C and assuming that the operator desires to send a control code to field station No. 2 for example, the positions the aforementioned switch and signal control levers 2SML and 2SGL respectively to the desired positions and pushes the start button 2PB.

In response to the operation of the start button 2PB, relay CH2 is picked up by a circuit which extends from (+) and includes the back contact of 2PB, the winding of relay CH2, the front contact of the cancellation button CNB, to (—). The picking up of the relay CH2 is effective to initiate a control cycle immediately, as the system is at rest, but if the system is in operation, this relay will store the starting of the cycle until such time as the system is free to transmit the controls that have been selected for transmission.

Relays LC and LCS are arranged to permit the transmission of control cycles to respective field stations in a predetermined order when a plurality of manual starts has been initiated. A relay LC is provided for each field station, and a single LCS relay is provided to be picked up in response to the picking up of any LC relay for the beginning of a control cycle and thereby prevents the picking up of any other LC relay until that operating cycle has been completed. Specifically, in response to the picking up of relay CH2, relay LC2 is energized by a circuit which extends from (+) and includes back contact 50 of relay SC, back contact 51 of relay LCS, wire 52, back contact 53 of relay CH3, front contact 54 of relay CH2, lower winding of relay LC2, and the front contact of cancel button CNB, to (—). In response to the picking up of relay LC2, relay LCS is energized by a circuit which extends from (+) and includes either back contact 55 of relay C, wire 56, or back contact 57 of relay SC, the winding of relay LCS, wire 457, front contact 58 of relay LC2, the upper winding of relay LC2, and the front contact of button CNB to (—). Another pick up circuit for relay LCS extends from (+) and includes back contact 59 of relay VS, wire 60, the winding of relay LCS, wire 457, front contact 58 of relay LC2, the upper winding of relay LC2 and front contact of button CNB, to (—). Thus in response to the picking up of relay LC2, the relay LCS is picked up and the relay LC2 is stuck in its energized position.

In response to the picking up of relay LCS, relay C is energized by a circuit which extends from (+) and includes back contact 61 of relay SD, front contact 62 of relay LCS, wire 63, back contact 64 of relay CF, the winding of relay C, wire 65, and cancel button CNB, to (—). A stick circuit for relay C is closed upon the picking up of relay SC during the conditioning period of the control cycle, to maintain the relay C picked up throughout the transmission of such cycle. This stick circuit extends from (+) and includes front contact 57 of relay SC, wire 66, front contact 67 of relay C, back contact 64 of relay CF, the winding of relay C, wire 65, and the cancel button CNB, to (—). Prior to the picking up of relay SC to establish this stick circuit, the office rest relay OR maintains the relay C in an energized position by a circuit which extends from (+) and includes front contact 68 of relay OR, front contact 67 of relay C and the remainder of the circuit being the same as for the previously described stick circuit.

CONTROL OFFICE CONDITIONING FOR CONTROL CYCLES

The picking up of relay C at the beginning of a control cycle is effective to open the line circuit by the opening of back contact 31 of relay C (see FIG. 1A).

The picking up of relay C also shunts the line battery CB by the closure of front contact 70 of relay C, thereby generating an impulse of energy across the secondary winding 19 of the transformer T3 which results in the shifting of the contacts of the line relay F to their right-hand position (see FIG. 1A). This action is more fully explained in a following paragraph.

The manner in which the contacts of line relay F at the control office effects the coding relays for a control cycle is illustrated in FIG. 3D. In response to the shifting of the contacts of line relay F to their right-hand position, relay LOT is energized by a circuit which extends from (+) and includes contact 71 of relay F in its right-hand position and the winding of LOT, to (—). Simultaneously relay LET is energized by a circuit which extends from (+) and includes contact 72 of relay F in its right-hand position, front contact 73 of relay OR, wire 74, back contact 75 of relay SD, wire 169, and the winding of relay LET, to (—).

The picking up of relays LET and LOT causes the relays SA, SB, SC and SD to be successively energized. The pick up circuit for relay SA extends from (+) and includes front contact 76 of relay LOT, front contact 77 of relay LET, wire 81, and the winding of relay SA, to (—). The pick up circuit for relay SB extends from (+) and includes front contact 78 of relay LOT, front contact 79 of relay LET, wire 80, and the winding of relay SB, to (—). The relay SA also serves to maintain the relay SB energized by a circuit which extends from (+), and includes front contact 82 of relay SA and the winding SB, to (—). In response to the picking up of relay SB, SC is picked up by an obvious circuit, which includes front contact 83 of relay SB. Relay SD is energized by the picking up of relay SB by an obvious circuit which extends from (+) and includes front contact 84 of relay SB. The relays SA, SB and SC remain picked up throughout the control cycle and are dropped away during the clear-out period of the control cycle as will be explained in detail hereafter. The relay SD is dropped away during the period of rest. In response to the picking up of the relay SA the relay FAE is energized by a circuit which extends from (+) and includes front contact 85 of relay SA, wire 69, back contact 86 of relay CF, back contact 87 of relay FA, back contact 88 of relay CF, wire 89 and the winding of relay FAE, to (—). Simultaneously with the movement of the line relay F to the right at the start of the conditioning period, the normally energized office rest relay OR is deenergized by opening its energizing circuit at the left-hand contact 20 of line relay F. The relay OR is a slow drop away relay and does not complete its dropping away until after the aforementioned relays LET, LOT, SA, SB, SC, SD and FAE have been picked up.

In response to the dropping away of the relay OR during the conditioning period, the relay LET is dropped away by the opening of front contact 73 of the relay OR in the previously described energizing circuit for relay LET. The relay LET is a slow acting relay, and is utilized to time the long "off" period. This causes the conditioning period to be relatively long during a control cycle. During an indication cycle the length of the conditioning period is relatively short. Upon the dropping away of the relay LET the impulsing relay E is picked up to terminate the conditioning period by a circuit from (+) potential through front contact 108 of the C relay, wire 109, back contact 153 of the VP relay, wire 154, back contact 155 of the LET relay, wire 156, front contact 157 of the FAE relay, wire 158, back contact 159 of the VP relay, back contact 160 of the V1 relay, wire 161, through the E coil, to (—) potential. Referring to FIG. 1A it is evident that the picking up of the relay E energizes the line circuit so that line wire L1 is positive and L2 is negative thereby causing the contacts of the line relays F at the field stations to assume left-hand positions.

In the control office, the picking-up of the E relay by the opening of back contact 90 removes the shunt across the line and in turn applies (+) potential to line L2, thereby decreasing the current through the primary winding 47 of the transformer T3. This change to a decreased current in the primary winding 47 causes a pulse of energy in the secondary winding 19 in such a direction as to actuate the contacts of the control office line relay F to their left-hand position. This pulse of energy referred to is a positive-going voltage pulse since at this time the load current through the circuit is decreased by adding more resistance to the load, i.e. the line filters, the line itself, and for any station the field relay (e.g. 2F) and its associated resistor (e.g. 2R). It will be noted that dots are added near the ends of each of the windings of transformer T3 which indicate the high potential end of the winding. A positive-going pulse in the primary winding 47 will cause a positive-going pulse to appear in the secondary winding 19 in the direction toward the dot near this winding. Consequently, since the left end of the secondary winding 19 is at a higher potential during this pulse, a current will flow in the secondary winding 19 from right to left. At this time there exists no other circuit than that through the coil of relay F since the LET, PC and PCP relays are all deenergized. The current through this remaining circuit will therefore flow through both the coils of the F relay from right to left.

For the sake of simplifying the explanation let us assume that the direction of current flow through the coils is effective to actuate the contacts of this relay in the same direction. As generally stated before it can now be clearly seen that current flowing from right to left in the coils will cause the contacts to be actuated from their right to their left-handed position. At this point, it might also be noted that the dropping of the relay E and closure of back contact 90 increases the current from the battery CB through the primary winding 47 of the transformer T3 by virtue of a relatively low resistance load RCO resistor and the primary resistance of the transformer T3 now being across the battery. This causes a pulse in the secondary winding 19 of said transformer in a direction to actuate the contacts of the control office line relay F to their right-hand positions. This control office line relay F is of the two-position polar type and are magnetically retained or stuck so that its contacts remain in the position to which they are last operated. It should be pointed out at this time that the picking up and dropping away of relay E alternately energizes and deenergizes the line circuit during a control cycle to provide distinct stepping periods.

OPERATION OF TYPICAL STEPPING PERIODS

With reference to the code chart in FIG. 2 the control station codes used for station selection during a control cycle and switch and signal control codes are made up of step periods which are characterized by their "on" or energized and "off" or deenergized periods either long and long respectively, or short and short respectively, or long and short respectively, or short and long respectively. In order to facilitate in discussion of the codes, the "on" and "off" periods of the steps are termed digits, and each digit is described as being either short or long and represented by a "S" or "L," respectively. According to the code chart of FIG. 2, for example, four steps are employed for station selection. Although FIG. 2 shows the codes for the selection of any one of four stations it is evident that the codes provide combinations for the selection of more than four stations.

The steps following those used for station selection are used for the communication and ultimate operation of controls. For example, the seventh stepping period comprising digits 13 and 14 are shown as being two long digits for the control of a switch to a normal position and two short digits to control the switch to a reverse position. The succeeding digits are employed to control the aspect to be displayed by a signal as illustrated in FIG. 2. FIG. 2 also shows that digit 9 is used for a maintainer's call code and digits 10, 11 and 12 are spare digits.

Following the stepping periods for the control of track switches and signals, a clear-cut period is provided which is an "off" period of the cycle. The clear-out period conditions the various coding relays so that the system will properly go into a "period of rest." Upon the completion of the "period of rest" the system is again prepared to be responsive to a control cycle or an indication cycle.

The character of the respective stepping periods during a control cycle is determined by the relays LL, LS, SL and SS. The relay LL is picked up at the beginning of an "on" period if the "on" and "off" digits of that stepping period are both to be long. The relay LS is picked up at the beginning of an "on" period if the digits of that step are to be respectively long and short. The relay SL is similarly picked up if the "on" and "off" digits of that stepping period are to be respectively short and long. Similarly, the SS relay is picked up if both the digits of that stepping period are to be short.

Assuming that a control cycle had been initiated for station No. 2 as heretofore mentioned, the push button 2PB had been operated (see FIG. 3A) and generally speaking the code determining relays LL, LS, SL and SS are picked up in response to the picking up of the line impulsing relay E. Specifically, at the beginning of the first "on" period the relay LL is picked up by a circuit which extends from (+), and includes front contact 91 of relay C, wire 92, make-before-break front contact 93 of relay E, wire 94, back contacts 95, 96, 97, 98, 99, 100, 101, 102 and 103 of the LV and V stepping relays, wire 104, front contact 105 of relay LC2, code jumper 106, wire 107 which is the LL bus and the winding of the relay LL, to (—). The pick up of the E relay also causes the F relay to revert to its normal or left-hand position as heretofore explained. This action in turn causes three things to happen. First, the LET relay is energized by a circuit path from positive potential through contact 466 on this F relay, over wire 167, through front contact 168 of the SC relay, over wire 169, to the coil of the LET relay and to negative potential. The second thing which happens is the pick up of the FA relay over a path from positive potential through contact 122 of the F relay, over wire 123, through front contact 124 on the SB relay, over wire 125, to the coil of the FA relay, thence to negative potential. The third thing which happens simultaneously with the first two is the drop out of the LOT relay which occurs because back contact 71 on the F relay is now open and since this is the only source of positive potential feeding the coil of this relay it now releases in a relatively long period of time which is characteristic of its type. By referring to FIG. 5A it can be seen under digit 1 that the next sequence following the pick-up of the FA relay is the pick up of the VP relay and the drop out of the FAE relay. Now that the SC and FA relays are both picked up a path is formed from positive potential through front contact 126 of the SC relay, over wire 127, through front contact 128 of the FA relay, over wire 129, through back contact 130 of the V1 relay through the coil of the VP relay to (—) potential, thus energizing it. Since the FA relay has just been picked up, contact 87 of the FA relay opens which causes the FAE relay to become deenergized. These latter two actions can be seen on the sequence chart of FIG. 5A under digit 1. Heretofore it was stated that the LOT relay dropped out and it was shown how this was accomplished. Also, it has been explained prior to this time how the LL relay had become energized. At this time also it is well to remember that the C relay is in a picked up condition. Having this combination results in the drop out of the E relay principally due to the opening of front contact 163 on the LOT relay. This new combination of conditions results in the application of stick energy to the LL relay. This stick circuit is closed upon the drop out of the E relay to maintain such relay picked up until the beginning of the next "on" period of the cycle. This circuit extends from (+) and includes front contact 91 of relay C, wire 92, make-before-break back contact 93 of relay E, wire 111, back contact 112 of relay LOT, wire 113, back contact 114 of relay SL, back contact 115 of relay LS, back contact 116 of relay SS, front contact 117 of relay LL and the winding of relay LL, to (—). This stick circuit insures that the relay LL will remain energized during the "off" digit of the first step period. At the beginning of the next "on" period, which, in this example, is digit No. 3, the relay SS is picked up, which picking-up interrupts the stick circuit for the relay LL at back contact 116 of relay SS, thus dropping away the code determining relay LL (see FIG. 5A). The relay SS is energized by a circuit which extends from (+) and includes front contact 91 of relay C, wire 92, make-before-break front contact 93 of relay E, wire 94, back contacts 95, 96, 97, 98, 99, 100, 101 and 102 of the LV and V stepping relays, the front contact 103 of the stepping relay V1, wire 118, front contact 119 of relay LC2, code jumper 120, wire 121, which wire is the SS bus and the winding of the relay SS, to (—). The SS relay is held in an energized position by a stick circuit similar to the one for relay LL through front contact 183 on the SS relay and back contact 182 on the LL relay only after the make-before-break contact 93 transfers to wire 111. At the beginning of the next "on" period, the relay SL is energized by a circuit through front contact 102 of the V2 relay similar to the ones for energizing the previous code determining relays LL and SS, which energizing circuit can be traced through the front contact 102 of relay V2. During the next "on" period which, in this example, is digit No. 7, the relay LS is energized by a similar pick-up circuit as that employed for the previous code determining relays through front contact 101 of the V3 relay. It should be noted that the code jumpers for the first four periods of the cycle which are used for station selection are in a fixed position and the various field stations which are not called by a particular control cycle are rejected when the particular code in one of the first four stepping periods disagrees with the code and the jumper connections for that particular field station. Referring to FIG. 2, it is apparent that the station selection code for station No. 2 agrees with the code determining relays which were picked up in the sequence previously described. If the operator had desired to select station No. 3 the LL relay would have been picked up in the fifth digit of the control cycle and the relay SL would be picked up in the seventh digit of the same cycle. Upon picking up of the relay LL in the fifth digit, stations No. 1 and 2 would have been rejected because the selection code for these stations calls for the picking up of the relay SL in the fifth digit of the cycle. Therefore, it can be seen from FIG. 2 that in general the various field stations are rejected at the start of any one of the first four stepping periods assuming a system consists of more than just the four stations shown. Due to the fact that the mode of operation of the various code determining relays LS, SS, SL and LL through all of the operating periods of the control cycle is illustrated in FIGS. 3A through 3D and is similar to that previously described for the first four stepping periods, it is considered unnecessary to literally explain each detail of their circuits.

OPERATION OF THE STEPPING RELAY BANK

After considering how the character of each of the steps is determined during a control cycle it is necessary at this time to briefly describe the principal of operation of the stepping relay bank (relays VP, V1 through V8, and LV) at the control office. As has been previously described the pulsing of the relay E for the transmission of impulses over the line circuit causes the line relay F to be energized to operate its polar contacts to a left-hand position during the "on" periods and to operate its polar contacts to a right-hand position during the "off" periods. Therefore, each time the relay picks up to mark the beginning of an "on" period the relay F moves its polar contact to its left-hand position. When the relay E is dropped away to mark the end of an "on" period or the beginning of an "off" period, the line relay F is caused to move its polar contacts to a right-hand position.

Figure 3C:
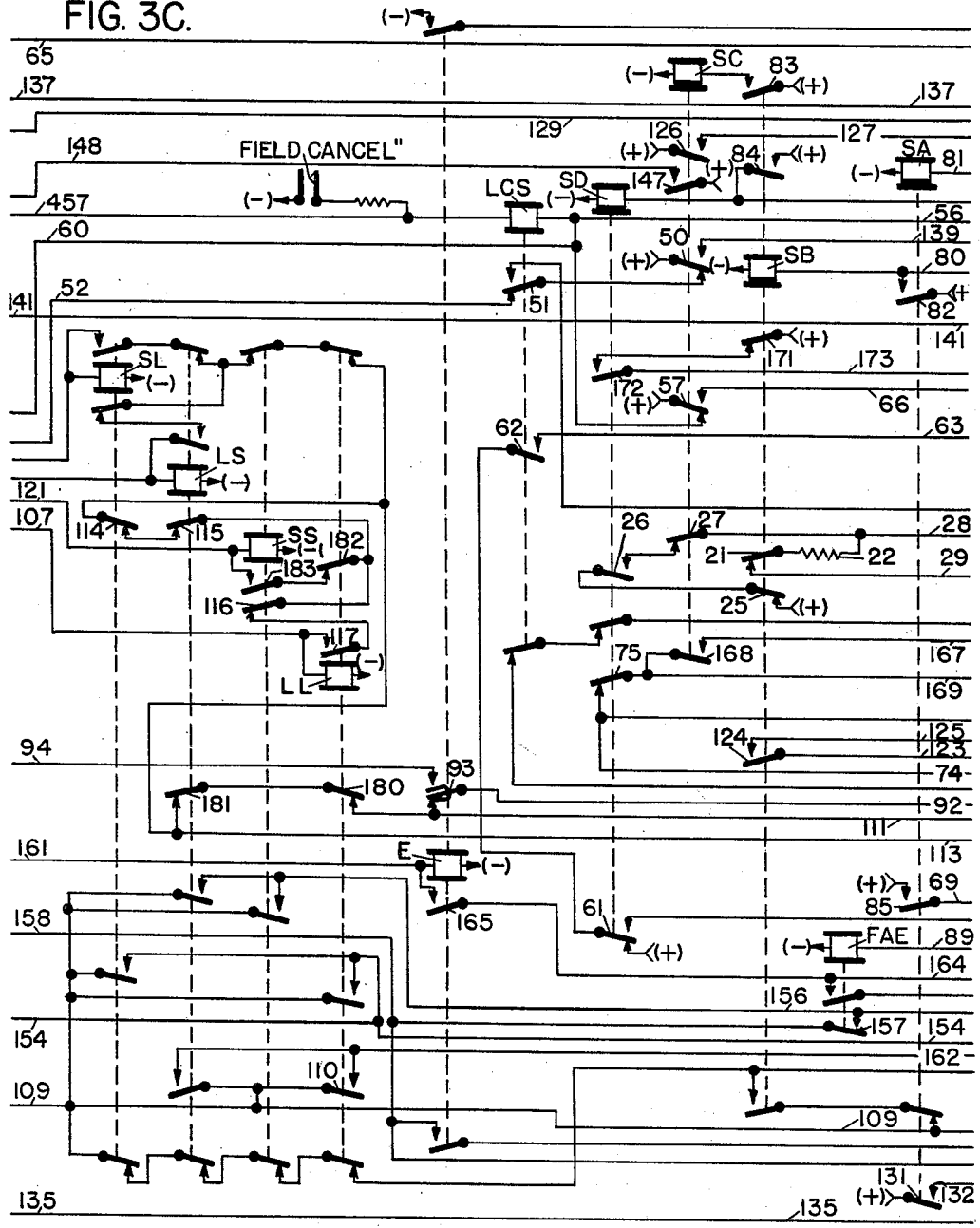

Referring to FIGS. 3C and 3D, each time the relay F moves its contacts to a right-hand position, the relay FA is deenergized. The circuit for energizing the relay FA has heretofore been enumerated and it is evident that the relay FA is energizing during the "on" periods of the control cycle and deenergized during the "off" periods. This can also be seen by referring to the sequence charts of FIG. 5.

The stepping relay bank is operated in response to the relay FA. The relay VP of the stepping relay bank shifts its position during each "on" period in response to the picking-up of the relay FA and a stepping relay V is picked up during each "off" period in response to the dropping away of the relay FA.

The relay VP is picked up in response to the picking up of relay FA during the first "on" period by a circuit which extends from (+) and includes front contact 126 of relay SC, wire 127, front contact 128 of relay FA, wire 129, back contact 130 of relay V1 and the winding of the relay VP, to (—). A stick circuit for relay VP is provided when the FA relay drops out which extends from (+) and includes front contact 131 of relay SA, wire 132, back contact 133 of relay CF, back contact 134 of relay FA, wire 135, front contact 136 of relay VP and the winding of relay VP, to (—). Another stick circuit is provided for relay VP when the FA relay is down which extends from (+) and includes front contact 126 of relay SC, wire 127, back contact 128 of relay FA, wire 137, front contact 138 of relay VP and the winding of relay VP, to (—). The previously described stick circuits serve to maintain relay VP picked up until after the shifting of back contact 134 and back contact 128 of relay FA to their respective front contacts upon the picking up of relay FA at the end of the "off" period.

Upon the dropping away of relay FA at the beginning of the first "off" period a circuit is closed to cause a picking up of the stepping relay V1. The circuit extends from (+) and includes front contact 50 of relay SC, wire 139, back contact 140 of relay FA, wire 141 front contact 142 of relay VP, back contact 143 of relay V8, back contact 144 of relay V6, back contact 145 of relay V4, back contact 146 of relay V2 and the winding of the relay V1, to (—). In response to the picking up of relay V1 a stick circuit is closed to maintain that relay picked up throughout the remainder of the cycle. This stick circuit extends from (+) and includes front contact 147 of relay SC, wire 148, front contact 149 of relay V1, the upper winding of relay V1, and the lower winding of relay V1, to (—).

During the second "on" period, the relay VP is dropped away upon the picking up of relay FA which interrupts its stick potential and is prevented from picking up because back contact 130 of relay V1 is now open in the previously described pick up circuit for relay VP. The stepping relay V2 is picked up while relay VP is dropped away and upon the dropping away of the relay FA to start the second "off" period. The pick-up circuit for relay V2 extends from (+) and includes front contact 50 of relay SC, wire 139, back contact 140 of relay FA, wire 141, back contact 142 of relay VP, front contact 150 of relay V1 and the lower winding of relay V2, to (—). The relay V2 is maintained picked up throughout the remainder of the cycle by an obvious stick circuit similar to that described for relay V1.

Thus, it can be seen that the various digits of the cycle are effected by the picking up and dropping away of relay FA which causes the picking up and dropping away of relay VP in a sequential pattern, which picks up the counting relays V1 through V8 in numerical sequence. Because of the similarity of the picking up of the other V relays, it is considered unnecessary to describe in detail the circuitry for the other periods of the control cycle in regards to the stepping relay bank.

However, it should be pointed out that the picking up of the relay VP during the last "on" period of the control cycle conditions a circuit for the relay LV so that such relay can be picked up upon the dropping away of the relay FA during the following clear-out period. This circuit extends from (+) and includes front contact 50 of relay SC, wire 139, back contact 140 of relay FA, wire 141, front contact 142 of relay VP, front contact 143 of relay V8, and the winding of relay LV, to (—). An obvious stick circuit for relay LV is closed at front contact 152 of relay V7 in order to maintain the LV relay picked up until the stepping relay bank is released later in the clear-out period.

*Generation of the Line Code Pulses*

Consideration will now be given to the specific manner in which the impulsing relay E (see FIG. 3C) is controlled in accordance with the characters of the step periods selected. Relay E is initially picked up to mark the beginning of the first "on" period. The relay E is picked up at that time in response to the dropping away of the timing relay LET by a pick up circuit which extends from (+) and includes front contact 108 of relay C, wire 109, back contact 153 of relay VP, wire 154, back contact 155 of relay LET, wire 156, front contact 157 of relay FAE, wire 158, back contact 159 of relay VP, back contact 160 of relay V1, wire 161, and the winding of relay E, to (—). Thus, it can be seen that the relay E is picked up at the beginning of each "on" period by a circuit which includes obvious front or back contacts of the stepping relay VP in conjunction with contacts of the other stepping relays.

Each time the relay E is picked up during a control cycle the line battery CB (see FIG. 1A) is connected across the line wires. The positive terminal of the battery CB is connected to the line wire L1, through resistance load ROC, back contact 30 of relay CF, front contact 90 of relay E, and back contact 32 of relay PCP. Therefore, it can be seen that the picking-up of relay E initiates a period of energization of the line circuit and the dropping-away of relay E ends that period. The length of time the relay E remains energized or deenergized is controlled by the code determining relays LL, LS, SL, and SS and thereby forms the code for this communication system.

Assuming that a code is to be transmitted for the selection of field station No. 2 (see FIG. 2) the relay LL is picked up at the beginning of the first "on" period and the picking-up of the relay LL establishes a stick circuit for maintaining the relay E picked up until the relay LOT drops away. This stick circuit (see FIG. 3D) extends from (+) and includes front contact 108 of relay C, wire 109, front contact 110 of relay LL, wire 162, front contact 163 of relay LOT, wire 164, front contact 165 of relay E, winding of relay E, to (—).

Recalling that at the beginning of digit 2 the polar contacts of the F relay move to the right position (see FIG. 5A), this action causes the drop-out of the FA relay and the LET relay, the latter being a slow release type. At the same time the LOT relay which dropped out during the long period of digit 1 is now reenergized. The drop out of the FA relay in turn causes the FAE and the V1 relays to be picked up and provides stick voltage to the VP relay, which previously had been picked up, through back contacts 128 and 134 of the FA relay which heretofore has been described. When the LET relay contacts transfer the E relay will again become energized in a manner as was described for this same action prior to the start of digit 1. It is obvious from FIG. 3B that the circuit would be completed through front contact 159 of relay VP, back contact 166 of relay V2, and front contact 160 of relay V1.

Having described briefly the principles of operation for the selection of the character of the step periods, the operation of the line relay, and the stepping bank, it is considered unnecessary to describe in detail the individual circuitry connected with each particular stepping period.

CLEAR-OUT PERIOD

Keeping in mind the principles hereinbefore mentioned and referring to FIG. 5B and 5C it is evident that the "clear-out" period is an "off" period in which the relay E is dropped away, i.e. down. In response to the shifting of relay F to its right-hand position, the relay LET is dropped away, due to the opening of contact 466 of relay F. During this period, the relay E is unable to become energized because of the fact that the back contact 170 of relay V8 is open rendering the picking up of relay E impossible. Because of the length of time that the relay LET requires to drop away, slow drop away relay SA is deenergized by the prolonged opening of front contact 77 of relay LET in the pick-up circuit for relay SA. The dropping away of the relay SA is indicative of the fact that the system is entering into a clear-out period. In response to the dropping away of the relay SA, relay SB is dropped-away and relay FAE is dropped away by the opening of front contacts 82 and 85 of relay SA respectively. Referring to FIGS. 5C and 3C it is evident that relay SC is deenergized in response to the dropping away of the relay SB. At this time, prior to the dropping away of relay SC and after relay SB has been dropped away, the relay PC is energized by a circuit which extends from (+) and includes back contact 171 of relay SB, front contact 172 of relay SD, wire 173, front contact 174 of relay C and the winding of relay PC, to (—). In response to the picking up of relay PC the relay PCP is energized by an obvious circuit which includes front contact 175 of relay PC. After the slow drop away period of relay SC is completed, the relay C is deenergized by the opening of its previously described stick circuit, at front contact 57 of relay SC. Simultaneously, with the dropping away of the relay C in response to the dropping away of the relay SC the stepping repeater relay VP is deenergized by the opening of front contact 126 of relay SC. Simultaneously, the stepping relays V1 and V2 are deenergized in response to the dropping away of relay SC by the opening of front contact 147 of relay SC in the previously described stick circuits for the V relays. The dropping away of the stepping relays V conditions the system so that they can be sequentially picked up during the next cycle of operation. The dropping away of the relay C also interrupts the stick circuit for any of the code determining relays LL, LS, SL and SS which may be energized in accordance with the character of the last digits in the cycle. Referring to FIG. 5C the relay SS was previously energized because the last digits in the cycle were both short. The stick circuit for the code determining relay SS, which was interrupted by the opening of front contact 91 of relay C, extends from (+) and includes front contact 91 of relay C, wire 92, back contact 93 of relay E, back contact 180 of relay LL, back contact 181 of relay LS, back contact 114 of relay SL, back contact 115 of relay LS, back contact 182 of relay LL, front contact 183 of relay SS and the winding of relay SS, to (—).

When relay C is dropped out it also applies negative voltage to the line L1 through front contact 45 of the PCP relay, since the latter is now in an energized condition. The circuit is completed from line 12 through front contact 32 of the PCP relay, through back contact 31 of the C relay, back contact 30 of the CF relay, resistance load RCO, to the (+) side of the battery CB. As will be explained later this negative potential applied to line L1 is required to momentarily pick up the F relay at rejected field stations prior to entering a period of rest.

In response to the dropping away of relay C the pole changing relay PC which was picked up previously during the clear-out period of the cycle is dropped away by the opening of front contact 174 of relay C in the previously described energizing circuit for relay PC. At this point it can be seen in FIG. 1A that a shunt is placed across the battery circuit by the closure of back contact 186, however, this high current impulse through transformer T3 produces no noticeable effect at this time because front contact 48 of the PCP relay is closed thus shorting out the normal response of the F relay. Also in response to the dropping away of relay PC the pole changing repeater PCP is dropped away by the opening of front contact 175 in the obvious circuit for relay PCP. With respect to the control office apparatus the relays PC and PCP in their dropped away position energize the office rest relay OR by the closure of their back contacts 24 and 23 respectively in the energizing circuit for relay OR. The picking up of relay OR commences the "period of rest."

Referring to FIG. 1A the picking up of relay OR opens its back contact 184 which removes the shunt from the battery circuit and since PCP relay is now dropped out, these conditions restore the line circuit to a condition where L1 is energized positively and L2 is energized negatively after picking up of relay OR at the end of the clear out period. The line wire L1 is at this time energized positively by a circuit which extends from the (+) side of the battery CB, resistance load ROC, back contact 30 of relay CF, back contact 31 of relay C, back contact 32 of relay PCP, filter windings 33 and 34 respectively, and the line wire L1. The removal of the shunt across the control office line relay F and the energization of the line circuit such that L1 is positive causes its contacts to be closed in the left-hand position. The relay SD is also deenergized in response to the picking up of relay OR by the opening of back contact 188 of relay OR in the obvious energizing circuit for relay SD (see FIGS. 3C and 3D).

When the control office line relay F at the beginning of the period of rest shifted its contacts to the left-hand position, the long odd timing relay LOT was deenergized by the opening of the contact 71 of relay F in the obvious energizing circuit for relay LOT. The aforementioned description generally describes the principles of operation of the code communication system at the control office during a complete cycle of operation.

FIELD STATION OPERATION

The operation of the field station apparatus will now be described in connection with the reception of a control code cycle for a particular field station during a complete cycle of operation. When the system is in a period of rest, the field stations have their line relays F connected across the line wires with their contacts in an energized or left-hand position which position is opposite from the position in which such contacts are spring biased when the relay is deenergized. The remainder of the coding relays in the field station, which relays are energized from a local direct current source, are disconnected from their local source of energy when the system is at rest.

Referring to FIGS 4A–4D it wil be assumed that the control office operator desires to send a control code cycle to field station No. 2. When energy is removed from the line circuit at the control office by the picking up of relay C to initiate the conditioning period the contacts of the relay 2F at the field station are released to assume their right-hand position to which they are spring biased. The shifting of contact 200 of relay 2F to its right-hand position closes a pick-up circuit for the relays 2LOT and 2FR. The circuit for picking up relay 2LOT extends from (+) and includes contact 200 of relay 2F in its right-hand position, back contact 201 of relay 2DO, back contact 202 of relay 2DR, and the winding of relay 2LOT, to (—). The pick-up circuit for relay 2FR extends from (+) and includes contact 200 of relay 2F in its right-hand position, back contact 201 of relay 2DO, back contact 202 of relay 2DR, back contact 203 of relay 2LET, front contact 204 of relay 2DE, back contact 205 of relay 2DR, and the winding of relay 2FR, to (—). The picking up of the relay 2FR closes an obvious pick-up circuit for relay 2LET which includes front contact 195 of relay 2FR and back contact 206 of relay 2DO. In response to the picking up of the relay 2LOT, the relay 2CD is energized by a circuit which extends from (+) and includes front contact 207 of relay 2LOT and the winding of relay 2CD, to (—). The relay 2SA is picked up in response to the picking up of relays 2LET and 2LOT by a circuit which extends (see FIG. 4A) from (+) and includes front contact 208 of relay 2LET, front contact 209 of relay 2LOT, back contact 210 of relay 2SO, and the winding of relay 2SA, to (—). Responsive to the picking up of the relay 2SA the upper winding of relay 2DE is energized by a circuit which extends from (+) and includes front contact 212 of relay 2SA, front contact 213 of relay 2DE, and the upper winding of relay 2DE, to (—). As previously mentioned, the relay 2DE is a mangetic stick relay which is held in its up position by a permanent magnet, and the energizing of the upper winding by the circuit previously described neutralizes the flux of the permanent magnet thereby driving it to its down position causing it to open its front contacts and close its back contacts. In response to the driving down of relay 2DE and the relay 2SB is energized by a circuit which extends from (+) and includes front contact 212 of relay 2SA, back contact 213 of relay 2DE, and the winding of relay 2SB, to (—). Responsive to the picking up of the relay 2SB the relay 2EE is energized by a circuit which extends from (+) and includes front contact 224 of relay 2SB, back contact 225 of relay 2LO, back contact 227 of relay 2FA, and the winding of relay 2EE, to (—). This EE relay is stuck by a circuit which starts with (+) potential through front contact 224 of the 2SB relay, back contact 225 of the 2LO relay, back contact 245 of the 2EO relay, front contact 249 of the 2EE relay, and through the coil, to (—). The slow drop-away relay 2FR is dropped away in response to the picking up of the relay 2LET by the opening of back contact 203 of relay 2LET in the previously described pick up circuit for relay 2FR.

The relay 2LED is picked up during the conditioning period in response to the picking up of the relay 2LET by a circuit which extends from (+) and includes either back contact 214 of relay 2SO or back contact 215 of relay 2EE, front contact 217 of relay 2LET and the winding of relay 2LED, to (—). When the slow drop away relay 2FR is completely dropped away the station selecting relay 2SO is energized by a circuit which extends from (+) and includes front contact 218 of relay 2SB, back contact 219 of relay 2LO, back contact 220 of relay 2FR, wire 221, back contact 222 of the stepping relay 2V1, back contact 223 of the stepping repeater relay 2VP and the upper winding of relay 2SO, to (—). Stick voltage is applied to this relay from (+) potential through front contact 245 of relay 2SB, front contact 246 of relay 2LOT, front contact 247 of relay 2EE, make-before-break back contact 248 of relay 2FA, back contact 249 of relay 2EO, front contact 268 of relay 2SO, through the coil to (—). The dropping away of relay 2FR interrupts the energizing circuit for relay 2LET by the opening of front contact 195 of relay 2FR thereby causing it to drop away. The relay 2LED is dropped away in response to the dropping away of relay 2LET by the opening of front contact 217 of relay 2LET in the stick circuit for relay 2LED which stick circuit extends from (+) and includes front contact 228 of relay 2LED, front contact 217 of relay 2LET and the winding of relay 2LED, to (—). In response to the picking up of the relay 2SO, the relay 2LOD is energized by a circuit which extends from (+) and includes back contact 229 of relay 2EO, front contact 230 of relay 2SO, wire 231, and the winding of relay 2LOD, to (—). Stick voltage is also applied to the 2LOD relay from (+) potential through front contact 255 of relay 2SB, front contact 256 of relay 2LOT, front contact 257 of relay 2LOD, through the coil, to (—).

The mode of operation of the stepping relay bank at the field station is typical of the mode of operation of the stepping relay bank at the control office and operation is described in detail in the aforementioned Hailes patent etc. and the GRS publication etc. The stepping at the field station differs in some respects, however, in that it is rendered effective in the control cycle only as the relays SO at each field station remain picked up and is rendered effective in an indication cycle only as long as the relay LO at each field station is picked up.

In digit No. 1 the contacts of the line relays at each field station are operated to their left-hand position in response to positive energization of the line wire L1. Referring to FIG. 2 the first stepping period consists of the long digit No. 1 and the long digit No. 2, and the second stepping period consists of short digit No. 3 and short digit No. 4 and the third stepping period consists of short digit No. 5 and long digit No. 6. The transmission of a control code cycle having the first three stepping periods carry codes of the character previously described will select the controls associated with field station No. 2, and lock out and render inactive, field station No. 3.

The shifting of contact 232 of relay 2F to its left-hand position (see FIG. 4A) closes a pick-up circuit for relay 2FA which extends from (+) and includes contact 232 of relay 2F in its left-hand position, back contact 233 of relay 2DO, front contact 234 of relay 2SB, and the winding of relay 2FA, to (—). Responsive to the moving of the line relay 2F to its left-hand position, the relay 2LET is picked up by a circuit which extends from (+) and includes contact 250 of relay 2F in its left-hand position, front contact 251 of relay 2SB, and the winding of relay 2LET, to (—). The picking up of relay 2FA which occurs during each "on" period in response to the operation of the relay 2F to its left-hand position commences the operation of the stepping relay bank as previously described in the aforementioned patent and publication. Also relay 2EO is energized in response to the picking up of relay 2FA by a circuit which extends from (+) and includes either front contact 236 of relay 2SA or front contact 237 of relay 2SB, front contact 239 of relay 2FA, back contact 241 of relay 2LO, and the winding of relay 2EO, to (—). The relay 2EO is held in an energized position by a stick circuit which extends from (+) and includes front contact 236 or 237 of relays 2SA or 2SB respectively, front contact 243 of relay 2EO, back contact 244 of relay 2EE, and the winding of relay 2EO, to (—). Responsive to the picking up of the relay 2EO the stick circuit for relay 2EE is broken at back contact 245 of relay 2EO. During digit No. 1 the relay 2LED is picked up by the closing of back contact 215 of relay 2EE in the previously described energizing circuit for relay 2LED.

During digit No. 2, which is also a long digit, and in response to the moving of the contacts of the relay 2F to its right-hand position, the relay 2FA is dropped away by the opening of left-hand contact 232 of relay 2F. Simultaneously, the relay 2LOT is picked up by the closure of contact 200 of relay 2F in its right-hand position. Simultaneously, the opening of left-hand contact 250 of relay 2F causes the dropping away of the slow drop-away relay 2LET, which relay in turn drops away relay 2LED. The dropping away of relay 2FA picks up relay 2EE by the closing of back contact 227 of relay 2FA in the pick-up circuit for relay 2EE. The picking up of relay 2EE drops away relay 2EO by the opening of back contact 244 of relay 2EE in the previously described stick circuit for relay 2EO. The relay 2LOD is picked up in response to the dropping away of relay 2EO by the closure of the back contact 229 of relay 2EO.

Digits No. 3 and 4 respectively operate in a similar manner as digits No. 1 and 2. However, because digits No. 3 and 4 are both short digits, the contacts of the relay 2F do not remain in their respective positions a sufficient length of time to allow the dropping away of the relays 2LET and 2LOT, respectively.

The operation of the relays associated with the other stations in the code communication system operate in a similar manner to the relays described in station No. 2 during the conditioning period and the digits of the cycle during the station selection portion of the cycle, which, in this example, comprises the first eight digits, as long as the station operate relay SO remains energized.

As previously mentioned the relay 2SO is picked up during the conditioning period and remains energized by the particular connection of its stick circuit through the stepping relay bank. After the relay VP picks up in the No. 1 digit the pick-up circuit for the relay 2SO is interrupted and the 2SO relay then depends solely upon its stick circuits to remain up. In the embodiment of this invention as well as in the aforementioned Patent No. 2,399,734 and GRS Handbook 45, it is well to keep in mind that an odd digit is compared with the odd code jumpers during the following even digit and an even digit is compared with the even code jumpers during the following odd digit. In assuming that the first control code transmitted in digit No. 1 is a long digit the relay 2SO is held energized by a stick circuit which extends from (+) and includes front contact 245 of relay 2SB, front contact 252 of relay 2EO, front contact 254 of relay 2LET, back contact 256 of relay 2LV, make-before-break front contact 257 of relay 2FA, wire 278, back contacts 258 through 265 of the stepping relay bank, back contact 266 of relay 2LV, make-before-break back contact 267 of relay 2LV, wire 270, front contact 268 of relay 2SO, and the lower winding of relay 2SO, to (—).

If digit No. 2 is a long digit a stick circuit will hold relay 2SO energized which will include make-before-break back contact 257 of the FA relay, wire 253, back contact 269 of relay 2LOD, jumper 271, back contact 272 of relay 2V2, back contact 273 of relay 2V4, back contact 274 of relay 2V6, make-before-break front contact 275 of relay 2VP, make-before-break back contact 267 of relay 2LV, wire 270, front contact 268 of relay 2SO, and the lower winding of relay 2SO, to (—).

Each of the field stations is distinctively wired so that its SO relay will drop away when a stick circuit is unable to be completed during a digit in the selection portion of the control code cycle. For the purposes of this disclosure it is only necessary to state that the station operative relay SO is dropped away in a digit following that in which the jumper connections provide an open circuit and consequently do not correspond to the control code transmitted during the station selection portion of the cycle. A more detailed description of the principles of operation of the SO relays is described in the aforementioned publication entitled, "GRS Centralized Traffic Control" dated October 1955 and copyrighted 1955.

*Operation at a Rejected Field Station*

Assuming that the control cycle called for the operation of traffic controlling apparatus associated with station No. 3 it can be seen from FIG. 2 that the fifth digit of the control cycle for the selection of station No. 3 is "long" while the fifth digit for the selection of station No. 2 is "short." Therefore, during digit No. 6 the stick circuit for relay 3SO is interrupted at station 3, since as heretofore stated the actual comparison is completed in the digit following that which is out of correspondence. Similarly station 4 would be rejected in the same manner at the same time, but station 1 on the other hand would not be rejected until digit 8 since digit 7 comprises the first dissimilar code.

In the following discussion relating to a rejected field station (e.g. number 3) the designation of the relays will be referred to by their proper designation, i.e. 3SB, 3FA, etc.; however, it is not deemed necessary to show a circuit for this particular field station, but rather simply refer to FIG. 4, station 2 circuitry, all the while bearing in mind that the same circuit applies to station 3. Until this discussion is completed relating to station 3, any reference to the circuitry of FIG. 4 is inferred as converting the reference characters on the relays from 3SB to 2SB, etc., in respectively reading from this specification while observing FIG. 4.

In response to the dropping away of relay 3SO the relay 3DR is prepared for energization and finally after relay 3FA picks up and relay 3EE drops out, the latter is effective to complete a circuit which extends from (+) and includes front contact 276 of relay 3SB, back contact 277 of relay 3LO, front contact 279 of relay 3FA, back contact 280 of relay 3EE, the lower winding of relay 3DR, and back contact 282 of relay 3SO, through R21, to (−). The picking up of relay 3DR renders the field line relay 3F unresponsive to the energizing of the line wires. The relay 3DR in effect pole changes the field line relay 3F through front contacts 38 and 39 of relay 3DR respectively (see FIG. 1B). The polarity of the voltage with which the field line relay 3F is energized when the 3DR relay is up is reversed, therefore, during the remainder of the code cycle the alternate "off" and "on" condition of the line wires L1 and L2 will be unable to alternately cause the energization of relay 3F thereby maintaining its contacts in the right-hand or released position because of the spring bias.

At this point, that is, when the DR relay reverses the polarity of voltage applied to the F relay, the stepping relays at the rejected field stations are disconnected from battery energy. When considered sequentially, in response to the position of the contacts of relay 3F in their right-hand position, the relay 3FA is deenergized by the interruption of its pick-up circuit at left-hand contact 232 of relay 3F. Prior to this time when the 3F relay contacts moved to the left-hand position, the 3LOT relay became deenergized. After its period of drop out was completed the stick voltage holding the 3LOD relay was interrupted by the opening of front contact 256 of relay 3LOT. In response to the dropping away of relay 3FA the relay 3EE is momentarily energized which in turn causes the dropping away of relay 3EO as previously described. The relay 3LET is deenergized by the opening of left-hand contact 259 of relay 3F and the 3LED relay is dropped away in response to the dropping away of relay 3LET. The drop out of the 3LOT relay causes the dropping away of the slow drop-away relay 3SA by breaking its stick voltage circuit by the opening of front contact 209 on the 3LOT relay. At the same time front contact 207 of the 3LOT relay opens which drops out the 3CD relay, since heretofore the other source of voltage for energizing the 3CD relay had been opened when back contact 500 of the 3DR relay had opened. The dropping away of relay 3SA drops away relay 3SB which causes the dropping away of these stepping relays V which had been previously energized, and also the relay 3EE. During the remainder of the control cycle field station No. 3 is in such a condition that all of its stepping relays are deenergized and disconnected from battery energy. The relay DR being a magnetic stick relay is held in its last operated position and consequently requires no battery energy.

It should be recalled at this point that the clear-out period is an "off" period followed by a line polarity reversal period in the control cycle, that is, a period wherein the line wires are deenergized, and during that portion of the clear-out period when the C relay is dropped away in response to the dropping away of the SC relay, the line wires are energized with a polarity opposite to the polarity which normally energizes the line wires during an "on" period of the control cycle.

Assuming that station No. 3 has been rejected during the selection portion of the cycle and the magnetic stick relay 3DR is in an energized position, the energizing of the line wires is such that line wire L1 is negative and L2 is positive during the latter portion of the clear-out period. The relay 3F is energized by a circuit which extends from the positively energized line wire L2, filter inductors 35 and 36, back contact 37 of relay 3LO, front contact 39 of relay 3DR, the windings of relay 3F, resistor 3R, front contact 38 of relay 3DR, back contact 40 of relay 3LO, filter inductors 41 and 42 and the negatively energized line wire L1. The energizing of the relay 3F causes its contacts to move to their left-hand position which energizes the upper winding of the relay 3DR so as to neutralize the holding flux, thereby knocking down the relay 3DR to its deenergized position. The circuit for knocking down the relay 3DR extends from (+) and includes contact 300 of relay 3F in its left-hand position, back contact 301 of relay 3SB, front contact 302 of relay 3DR, and the winding of relay 3DR to (−).

Referring again to FIG. 1B the dropping away of relay 3DR connects the field line relay 3F to the line wires L1 so that it will be responsive to the energizing of the line wires with a normal positive polarity. In response to the dropping away of the relay 3DR the relay 3F is energized by a polarity which will now cause the relay 3F to assume a deenergized position. Therefore, at this point the contacts of the relay 3F at the rejected field station are in the same position as the field station which was being controlled during the operating cycle.

The drop out of the 3DR relay also causes the pick-up of the 3CD relay. This is a cycle distribution relay which is effective to shorten the period of rest of a rejected station thereby allowing it to be first chosen in the event a stored start for a new cycle is awaiting initiation for that particular station. When a control cycle is being received by a station, e.g., such as station 2, the 2CD relay is not energized until the start of the period of rest, whereas in the above instance the 3CD relay is energized shortly after the line L1 is negatively polarized. Therefore the period of rest of a rejected station becomes shorter by an amount determined approximately by the sum of the drop out times of the PC and PCP relays. Also, it is well to recall that the relays PC and PCP at the control office are deenergized in response to the dropping away of the relay C by the opening of front contact 174 in the previously described pick-up circuit for relay PC. The relays PC and PCP are slow drop-away relays so that the rejected field locations will have sufficient time to react to the pole changed condition of the line wires, after the dropping away of the relay C and before the dropping away of the relays PC and PCP. In response to the dropping away of the relay PCP, the relay OR is energized which marks the beginning of the period of rest.

Assuming that station No. 2 was the station that had been selected, then during the clear-out period the relay 2FA is deenergized in response to the movement of the contact 232 of relay 2F to its right-hand position. The relay 2LET is deenergized in response to the movement of the contact 250 of relay 2F to its right-hand position causing the drop out of relay 2LET, which in turn causes the dropping of relay 2LED followed by the dropping away of relay 2SA. In response to the dropping away of relay 2SA, relay 2SB is deenergized, which in turn, causes the dropping away of the stepping bank relays 2V. The station operative relay 2SO is dropped out by the opening of front contact 267 of relay 2LV which is the final source of stick voltage for this relay. When relay 2SO drops away the energizing circuit for relay 2LOD is opened thereby releasing it. In response to the dropping away of relay 2SA the relay 2DO is energized by a circuit which extends from (+) and includes back contact 211 of relay 2SA, front contact 290 of relay 2LOT, front contact 291 of relay 2SB, and the winding of relay 2DO, to (—). This is a magnetic stick type relay and therefore will remain in this position until it is driven down at the beginning of the period of rest.

At this same time during the clear-out period after the relay 2SA drops away and before the relay 2SB drops away, in a code storage system the code storage relays are stuck-up until the 2LV relay drops out to insure the transfer of the coded data to the execution or field application circuits. The pick-up of the 2DO relay also drops out the 2LOT relay during the clear-out period so that it will be prepared for the following action at the start of the period of rest. The falling away of the 2LOT relay at this time causes the 2CD relay to drop out since its other source of (+) potential is open circuited by the energization of the 2DO relay. The picking up of the 2DO relay prepares a circuit for picking up relay 2LOT when the line relay 2F is energized which circuit extends from (+), and includes contact 232 of relay 2F in its left-hand position, front contact 233 of relay 2DO, front contact 201 of relay 2DO, back contact 202 of relay 2DR, and the winding of relay 2LOT, to (—). Also the relay 2LET is prevented from being picked up when the system goes into a period of rest with the relay 2DO up by the opening of back contact 206 of relay 2DO. When the 2DO relay is deenergized, a circuit is prepared for picking up the relay 2DE in the period of rest by closure of back contact 334 of relay 2DO. The relay DE pick-up must wait until near the end of the period of rest when the relay CD releases so that the cycle distribution of the various field stations will not be nullified. There are also other functions of the DO relay which will be apparent during the description of the operation of the field location apparatus during an indication cycle. After the relay 2SB has completed its dropping away during the clear-out period the stepping relays 2V and the relay 2EE and 2LOD are dropped away in a manner well known in the art. After the 2LV relay is dropped out the 2SO relay is deenergized by the opening of front contact 267 of the 2LV relay, since at this time the final source of (+) potential to the stick circuit for the 2SO relay is through back contact 281 of the 2SA relay.

By referring back to the control office cycle it will be recalled that during the final portion of the clear-out period the line L1 was polarized negatively. This is mentioned here to point out the difference between the functioning of this selected station with respect to an unselected station, such as station 3. Throughout this negative polarization period of line L1, the line relay 2F remains in its deenergized or right-hand position, and consequently the entire system at station 2 remains in a state of quiescence.

At the beginning of the "period of rest" the relay 2F moves its contacts to the left-hand or "on" position in response to the line L1 now becoming positively polarized, and the relays of field station No. 2, which is assumed to be the field station which was selected during the control cycle, operate in the following manner. The field rest relay 2FR is energized in response to the closing of an energizing circuit, which extends from (+) and includes contact 250 of relay 2F in its left-hand position, back contact 251 of relay 2SB, back contact 321 of relay 2DE, back contact 205 of relay 2DR, and the winding of relay 2FR, to (—). At the same time the 2LOT relay is energized which in turn energizes the 2CD relay. In response to the picking up of the relay 2CD, the knock down circuit of the relay 2DO is energized, which circuit extends from (+) and includes front contact 322 of relay 2FR, front contact 323 of relay 2CD, front contact 324 of relay 2DO, and the upper winding of relay 2DO, to (—). The knocking down of the magnetic stick relay 2DO causes the relay 2LOT to drop away by the opening of front contacts 201 and 233 of relay 2DO. In response to the dropping away of relay 2LOT the cycle distribution relay 2CD is deenergized by the opening of front contact 207 of relay 2LOT. The alternate circuit for holding the relay 2CD energized is not involved at this time for the 2FR relay is maintained energized therefore make-before-break back contact 325 of relay 2FR is open. If there are no stored starts the system will go into a quiet period and in response to the dropping away of the cycle distribution relay 2CD, the magnetic stick relay 2DE is energized by a circuit which extends from (+) and includes front contact 328 of relay 2CH, back contact 329 of relay 2CHP, wire 330, back contact 331 of relay 2SA, front contact 332 of relay 2FR, back contact 334 of relay 2DO, back contact 333 of relay 2CD, and the lower winding of relay 2DE, to (—). If there were any stored starts, waiting to start either a control cycle or an indication cycle, the relay 2DE would fail to pick up because contact 329 of relay 2CHP would be open and/or contact 328 of relay 2CH would be open. When the relay 2DE picks up local battery energy is removed from the relay 2FR at back contact 321 thereby dropping it out and maintaining the system in a period of rest until reactivated. This final action of the dropping out of the 2FR relay may be termed the end of the preparation for a "period of rest."

The picking up of the relay 2DE also opens a circuit at its back contact 327 to prevent the relay 2CD from becoming energized in response to the dropping away of the field rest relay 2FR. The picking up of the relay 2DE also prevents the relay 2CHP from becoming energized by the opening of its energizing circuit which extends from (+) and includes back contact 425 of relay 2CD, back contacts 426 of relay 2DO, front contact 427 of relay 2FR, wire 428, back contact 429 of relay 2DE, resistor 430, wire 431, the winding of relay 2CHP, and back contact 432 of relay 2CH, to (—). The cycle distribution feature is retained because the relay 2DE cannot pick up unless the relay 2CD has dropped away. The relay 2DE also provides a circuit which includes its front contact 204, over which the relay 2FR is picked up when the field line relay 2F is released to its right-hand position to begin the conditioning period of a new control cycle.

Assuming that there are no waiting controls or indications the CTC system will go into a period of quiescence at a rejected field station such as No. 3 for example. At the beginning of the period of rest the field line relay 3F, like others, is energized so that its contacts are operated to their left-hand or "on" position. Responsive to the operation of contact 250 of relay 3F the relay 3FR is picked up. In response to the picking up of the relay 3FR the relay 3CD is dropped away by the opening of back contact 325 of relay 3FR. The dropping away of the relay 3CD picks up the relay 3DE by closing the pick up circuit for the lower winding for the relay 3DE at back contact 333 of relay 3CD. Responsive to the picking up of the relay 3DE the field relay 3FR is dropped away by the opening of the back contact 321 of relay 3DE.

Therefore, it is apparent that the magnetic stick relay DE so conditions the circuitry in a "period of rest" that the field stepper unit is responsive to the movement of the field line relay at the location even though the various stepper relays are disconnected from local battery energy during a period of rest.

Similarly, the magnetic stick relay DO so conditions the circuitry when a field location is rejected during an indication cycle or the CTC line circuit is deenergized for long periods of time, e.g. a broken or short circuited line condition, that the field stepper unit is responsive to the movement of its field line relay even though the various stepper relays are disconnected from local battery energy during the time when the stepper has cleared out because of rejection or broken line wires.

*Indication Cycle*

Figure 4A:
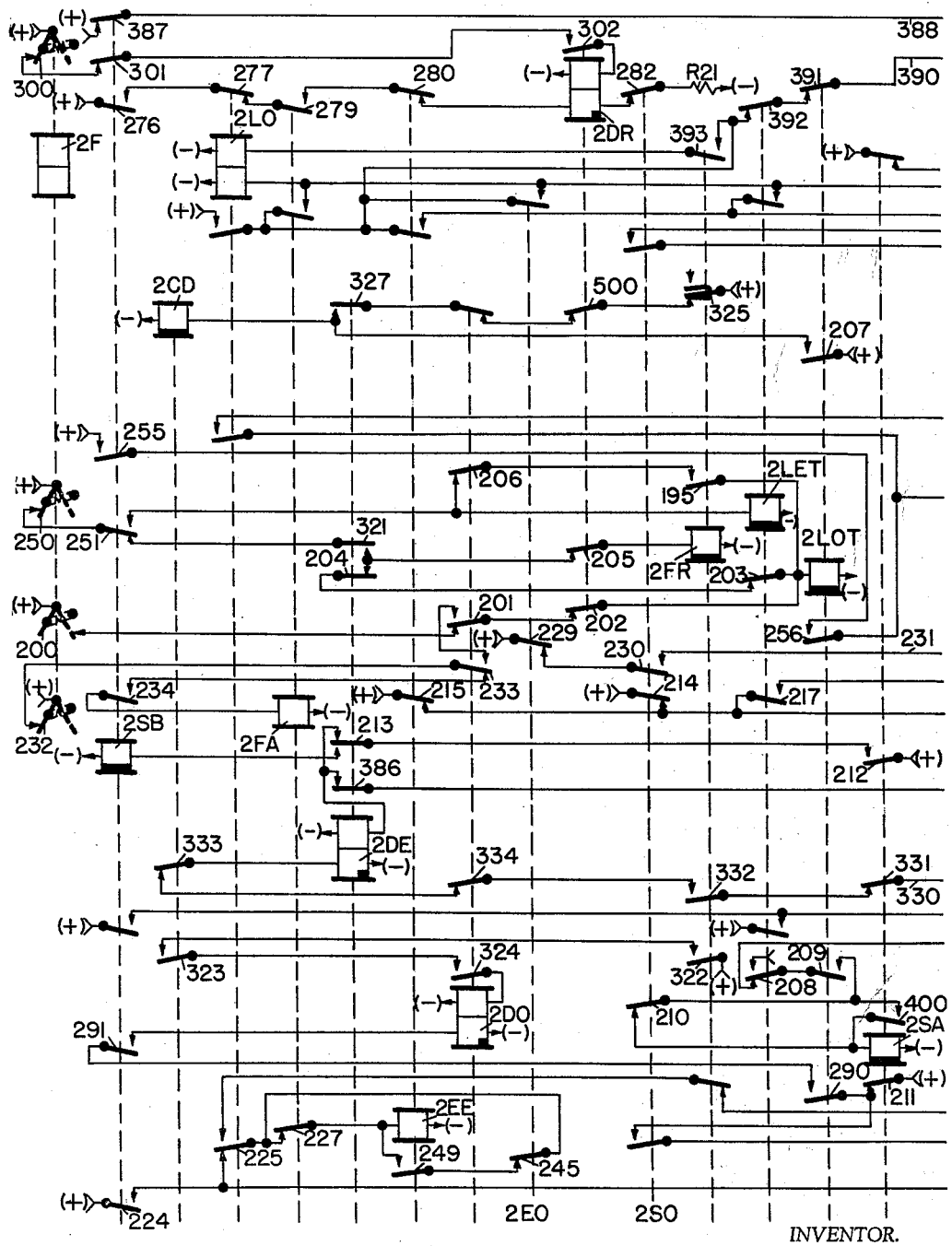
Figures 4C, 4E:
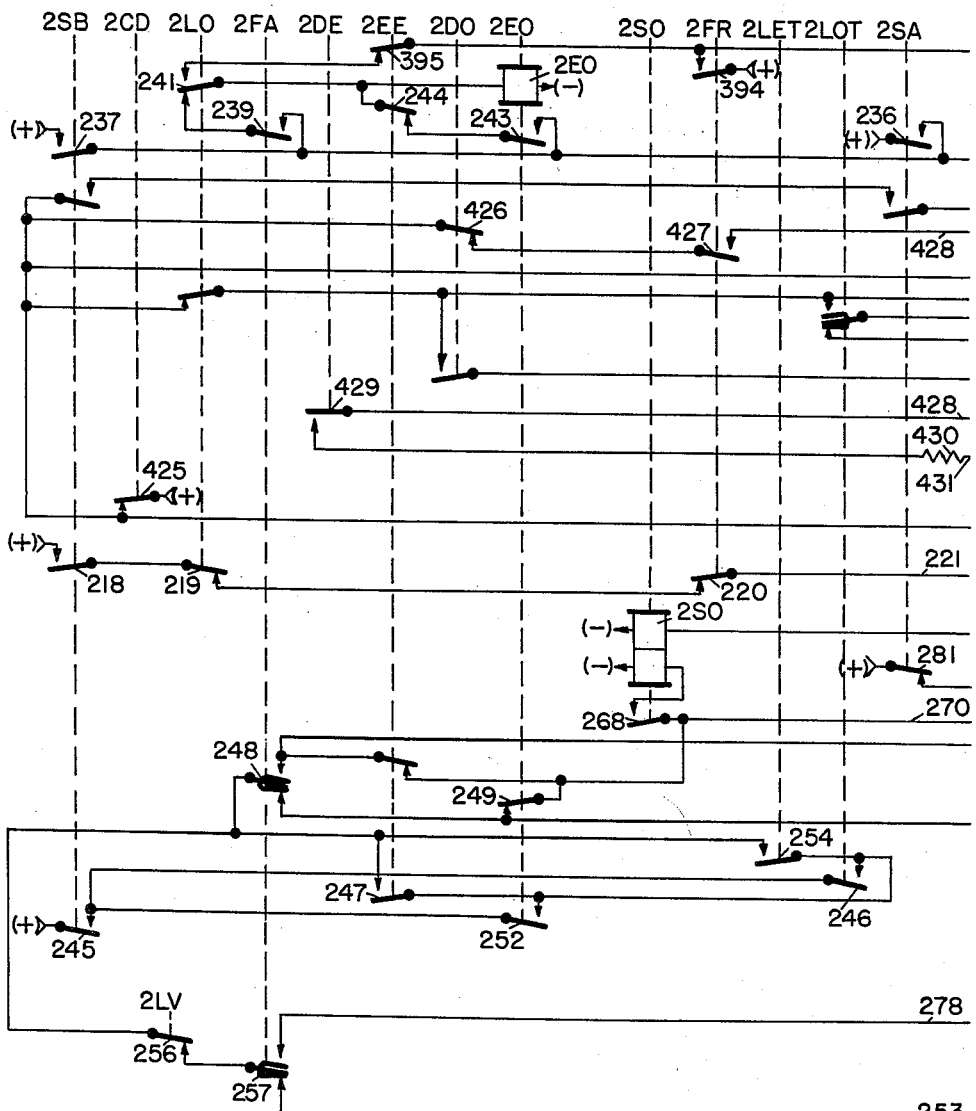
Figure 4D:
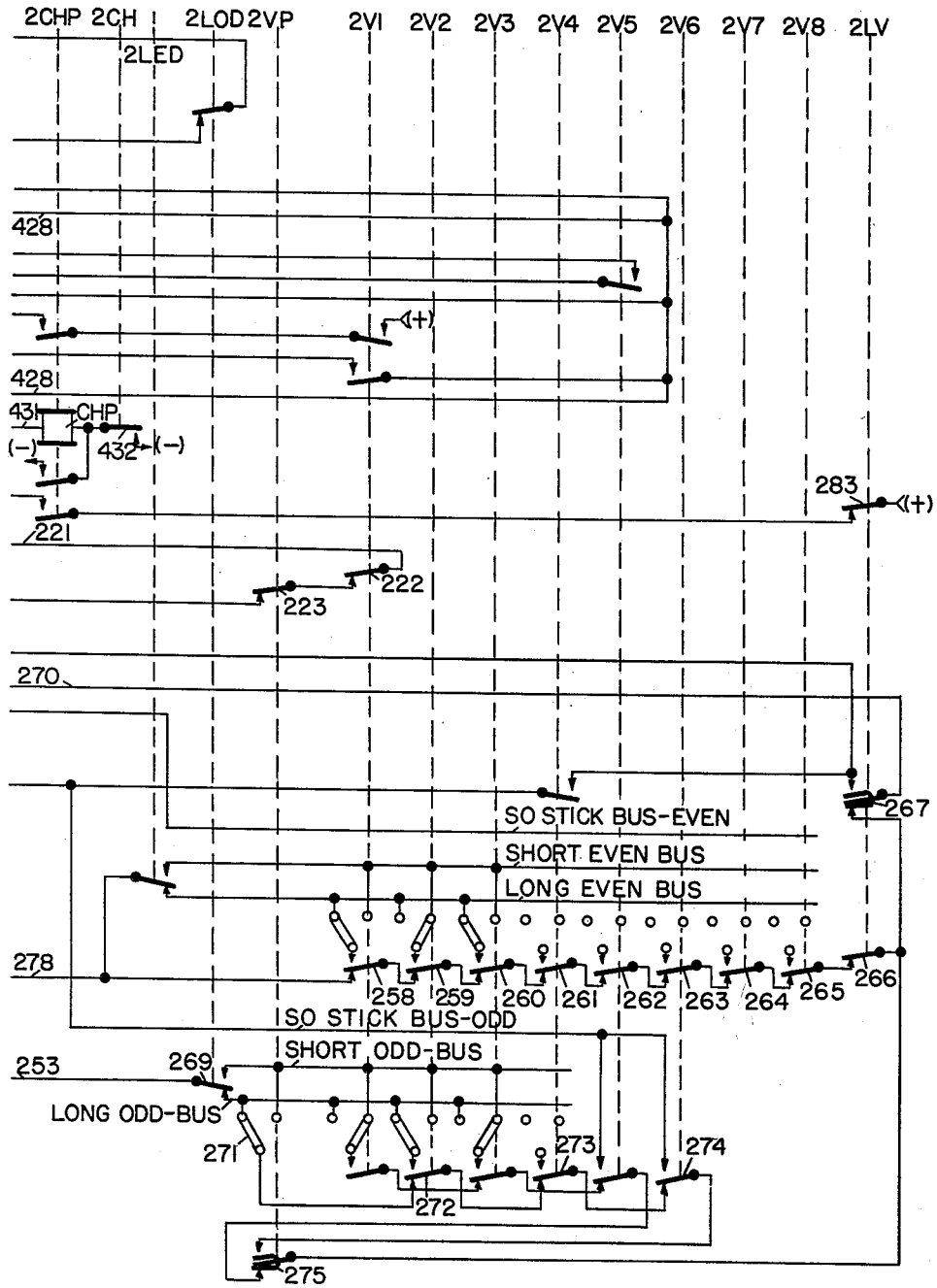

Referring to FIGS. 4A–4D the relays 2RAT and 2LAT are traffic approach relays which are operated in response to the occupancy of the right approach and left approach track sections respectively, associated with field station No. 2. The relays 2RAT and 2LAT are provided with make-before-break contacts wherein the front and back contacts of the respective 2RAT and 2LAT relays are momentarily bridged across during the operation of each relay. Therefore, when traffic conditions change in the area associated with field station No. 2 one or more of the traffic approach relays are operated. The relay 2CH is provided with a pick-up winding and a knock-down winding. The pick-up winding shown in FIG. 4B is assumed to be the lower winding, and the upper winding is assumed to be the knock-down winding. As relay 2CH is normally in its picked up condition, and is a magnetic stick type relay it is drawing no electrical energy during the time that it remains picked up. When the relay 2RAT is operated, for example, the upper winding of the relay 2CH is energized momentarily causing the relay 2CH to be knocked down to its deenergized position by a circuit which extends from (+), and includes both the front and back contacts 48 of relay 2RAT during the interval that it is being operated, front contact 49 of relay 2CH, and the upper winding of relay 2CH, to (−). Once the relay 2RAT, or example, has fully picked up or released, the knock-down circuit for the upper winding of relay 2CH will be open at the make-before-break contact 48. It is apparent from FIG. 4B that the relay 2CH is knocked-down in the event that the track relay T is operated or in the event both the relays 2RAT and 2LAT move simultaneously. Another set of conditions which will cause the 2CH relay to drop out are the 2SA relay being down, the 2SO and the 2V4 relays being picked up, and the 2LV relay being down. It is also apparent that the front contact 49 opens the knock-down circuit when the relay 2CH is released. Therefore, the 2CH relay together with the relays 2RAT and 2LAT are so connected circuitwise that the relay 2CH is responsive to changes in conditions at its associated field location, but does not draw any battery current in order to remain responsive.

Assuming that traffic conditions change at field station No. 2 the relay 2CH is knocked down as previously described. In response to the releasing or knocking down of relay 2CH, the magnetic stick relay 2DE is released by closing its knock-down circuit which extends from (+) and includes back contact 385 of relay 2CH, front contact 386 of relay 2DE, and the upper winding of relay 2DE, to (−). In response to the release of relay 2DE, the relay 2FR is energized by a circuit which extends from (+) and includes contact 250 of relay 2F in its energized or left-hand position, back contact 251 of relay 2SB, back contact 321 of relay 2DE, back contact 205 of relay 2DR and the winding of relay 2FR, to (−). The relay 2CHP is picked up in response to the dropping away of relay 2DE over a circuit which has been previously described. In response to the picking up of the relay 2CHP the "location on" relay 2LO is picked up by a circuit which extends from (+) and includes back contact 387 of relay 2SB, wire 388, front contact 389 of relay 2CHP, wire 390, back contact 391 of relay 2LOT, back contact 392 of relay 2LET, front contact 393 of relay 2FR, and the upper winding of relay 2LO to (−). Also in response to the pick up of the 2CHP relay the 2CH relay is restored to its picked-up position from the bus marked "CH restoration" on FIG. 4B.

Referring to FIG. 1B the picking up of the relay 2LO changes the polarity of the voltage applied to field line relay 2F causing it to release its contacts and assume a right-hand position. Simultaneously, with the picking up of the relay 2LO the relay 2EO is picked up which shunts the line circuit. The circuit for energizing the relay 2EO extends from (+) and includes front contact 394 of relay 2FR, back contact 395 of relay 2EE, front contact 241 of relay 2LO, and the winding of relay 2EO to (−).

The releasing of the relay 2F at the beginning of the period of the cycle causes the deenergization and subsequent slow drop-away of relay 2FR by the opening of left-hand contact 250 of relay 2F in the previously described energizing circuit. During the operation of the indication cycle for the remaining digits, the operation of the relays for field station No. 2 is similar to their operation as shown in the aforementioned patents and publications until the clear-out period of the indication cycle. It is well to bear in mind at this time that the F relay at the control office will follow the numbered F relay at that field station in the process of transmission. When the F relay contacts move to a right-hand position the CF relay at the control office is picked up causing a polarity change in the line, consequently, all other stations except that one transmitting indications remain idle. This will be discussed in detail at a later time. Since the transmitting station LO relay (e.g. 2LO) had been picked up just a moment before the CF relay, the overall effect will be to retain polarity correspondence between the transmitter and the receiver inasmuch as the double polarity change reverts the system to normal polarity conditions. At all the idle stations the numbered LO relay cannot become energized therefore they are all receiving reversed polarity codes after the conditioning period which in effect causes no reaction at these locations.

At the beginning of the clear-out period, the line relay 2F operates its contacts to the right-hand or "off" position and the relay 2FA is deenergized in response thereto by the opening of left-hand contact 232 of relay 2F in the previously described pickup circuit for relay 2FA. In response to the dropping away of relay 2FA, the relay 2LV is picked up in the manner well known in the art, and in response to the picking up of relay 2LV the relay 2CHP is dropped away by opening its stick circuit at back contact 283 of relay 2LV. When the relay 2F moves to its right-hand position the relay 2LET is dropped away by the opening of left-hand contact 250 of relay 2F in the previously described energizing circuit for relay 2LET. Responsive to the dropping away of relay 2LET the relay 2SA is dropped away by the opening of front contact 208 of relay 2LET in the stick circuit for relay 2SA which stick circuit extends from (+), and includes front contact 208 of relay 2LET, front contact 209 of relay 2LOT, front contact 400 of relay 2SA, and the winding of relay 2SA to (−). In response to the dropping away of the relay 2SA, the magnetic stick relay 2DO is picked up by a circuit which extends from (+), and includes back contact 211 of relay 2SA, front contact 290 of relay 2LOT, front contact 291 of relay 2SB, and the lower winding of relay 2DO to (−). The dropping away of relay 2SA also causes the relay 2SB to drop away by the opening of front contact 212 of relay 2SA in the energizing circuit for relay 2SB. The dropping away of the relay 2SB then causes the dropping away of the various stepping relays, the relay 2EO, the relay 2LO, and the relay 2LOD, in the manner well known in the art. The dropping away of relay 2SB also opens the pick-up circuit for relay 2DO at front contact 291 of relay 2SB rendering the relay 2DO held up by its permanent magnet. Responsive to the picking up of the relay 2DO, the relay 2LOT is dropped away by the opening of back contact 201 of relay 2DO in the energizing circuit of relay 2LOT. The deenergization of the relay 2CD by the opening of front contact 207 of relay 2LOT completes the clear out period of the indication cycle for a transmitting field station.

At the beginning of the period of rest the relay 2F is energized so that its contacts assume a left-hand position and the relay 2FR is picked up by the closing of left-hand contact 250 of relay 2F in the energizing circuit for relay 2FR. The relay 2LOT is simultaneously picked up by the closure of left-hand contact 232 of relay 2F in the energizing circuit for relay 2LOT. It should be pointed out at this time that while the relay 2CD was deenergized during the clear-out period, it did not complete its dropping away because the picking up of relay 2LOT reenergized relay 2CD at front contact 207 of relay 2LOT. The relay 2DO is dropped away in response to the pick up of relay 2FR. Responsive to the dropping away of the relay 2DO in the period of rest the relay 2LOT is dropped away by the opening of front contact 201 on relay 2DO in the energizing circuit for relay 2LOT. The dropping of relay 2LOT deenergizes relay 2CD. In response to the dropping away of the relay 2CD the relay 2DE is energized by the closing of back contact 333 of relay 2CD. The picking up of relay 2DE removes energy from relay 2FR by the opening of back contact 321 of relay 2DE. The dropping away of the relay 2FR removes battery energy from relay 2DE at front contact 332 of relay 2FR and the relay 2DE is held picked up by its permanent magnet alone. The picking up of the relay 2DE provides a path over which the relay 2FR can be picked up when the line relay 2F is energized to a right-hand position to start a conditioning period of a new cycle. It should be pointed out that in order to pick up the relay 2DE in the period of rest, the relays 2SA, 2CHP, 2CD and 2DO must be down and the relay 2FR and 2CH must be up. This condition means that the system is going into a period of rest with no stored starts waiting to be handled.

Let us now examine station No. 3, for example, as being typical of the operation of any idle station on the line while indications are being transmitted to the control office because of a change in traffic conditions associated with station No. 2 as heretofore explained. The relay 3F is released to its right-hand position in response to the picking up of the relay 2EO associated with station No. 2 in the manner previously described. It will be recalled that this function places a short-circuit across the line at station No. 2, therefore the voltage across the line at all other stations will approach zero. In response to the releasing of the field line relay 3F, the relays 3FR and 3LOT are picked up simultaneously in the manner previously described. In response to the picking up of the relay 3LOT, the relay 3CD is picked up, and in response to the picking up of the relay 3FR, the relay 3LET is picked up. In response to the picking up of the relay 3LET, the slow drop-away relay 3FR is deenergized. The picking up of the relay 3LET also picks up the relay 3SA and 3LED. The picking up of the relay 3SA knocks down the relay 3DE by the closing of front contact 212 of relay 3SA. The knocking down of relay 3DE picks up the relay 3SB by the closing of back contact 213 of relay 3DE. The pick-up of relay 3SB causes the 3EE relay to be energized through front contact 224 of the 3SB relay. When the relay 3FR has completely dropped away, the relay 3LET is deenergized and relay 3SO is energized, which in turn causes the 3LOD relay to become energized. The drop out of the 3LET is followed by the dropping away of relay 3LED, which results in the dropping away of the relay 3SA. The dropping away of the relay 3SA picks up the relay 3DO by the closing of back contact 211 of relay 3SA with front contact 290 of relay 3SB closed. The dropping way of relay 3SA causes the dropping away of relay 3SB which results in the dropping away of relay 3EE and relay 3SO which results in the dropping away of relay 3LOD. The picking up of the relay 3DO deenergizes the relay 3LOT because of the opening of front contact 201 of relay 3DO in the energizing circuit for relay 3LOT. The dropping away of relay 3LOT deenergizes the relay 3CD at front contact 207 of relay 3LOT. Therefore, it is apparent that the picking up of the relay 3DO during an idle indication cycle causes the remaining relays which are energized to be disconnected from battery energy during that cycle while another field station is transmitting.

Nothing further occurs regarding the relays of a non-transmitting field station during an idle indication cycle until the beginning of the period of rest. This is due to the line L1 being polarized negatively by the pick-up of the CF relay at the control office until the start of the clear-out period. Throughout this period a shunt circuit exists across the line at station No. 2, but then when this is removed at the beginning of the period of rest the relay 3F is energized to its left-hand position which causes relays 3FR and 3LOT to be picked up. In response to the picking up of the relay 3LOT the relay 3CD is energized. The picking-up of the relay 3CD knocks down the relay 3DO which in turn deenergizes the relay 3LOT. The dropping away of the relay 3LOT deenergizes the relay 3CD. If there are no stored starts relay 3CH will be up and 3CHP will be down and the relay 3DE will be picked up in response to the dropping away of the relay 3CD. The picking-up of the relay 3DC deenergizes the field rest relay 3FR. The dropping away of the relay 3FR opens the deenergizing circuit for the relay 3DE but relay 3DE is a magnetic stick relay and remains up. At this point the system is in a period of rest and all communication relays are disconnetced from the battery.

In summary it should be pointed out that if there are any stored starts the magnetic stick relay 3DE will not pick up and the new cycle will commence without delay in the usual manner.

In the event that a line wire should become defective or shorted thereby causing the field line relays to become deenergized the communication relays for all of the field stations effected by such a faulty line circuit will react in the same manner as though an idle indication cycle were present which would prevent the needless drain of battery energy during the time that the defective line wire condition exists.

Having described a centralized traffic controlling system as one specific embodiment of the present invention, it is desired to be understood that this form is selected to facilitate in the disclosure of the invention rather than to limit the number of forms which the invention may assume, and it is further understood that various adaptations, alterations, and modifications may be applied to the specific form shown to meet the requirements of practice, without in any manner departing from the spirit or scope of the present invention, except as limited by the appended claims.

What I claim is:

1. A centralized traffic control system for railroads, comprising a line circuit extending between a control office and a plurality of field stations, code transmitting means at said control office for energizing and deenergizing said line circuit with voltage of one polarity for successive periods to form a code cycle, a polar line relay at each field station connected across said line circuit for repeating the operation of said code transmitting means, code receiving means at each field station responsive to the operation of its respective polar line relay, circuit means governed in accordance with the code received by said receiving means for reversing the polar connections to its respective line relay at selected ones of said field stations, and means effective at the end of each cyle to energize said line circuit with voltage of opposite polarity momentarily to restore the reverse connected polar line relays to normal positions.

2. In a centralized traffic control system for railroads, a line circuit extending between a control office and a plurality of field stations, pulsing means at the control office for energizing and deenergizing said line circuit with voltage of one polarity a predetermined number of times to form a code cycle, a polar line relay at each said field station connected in parallel across said line circuit operative to be energized to repeat each pulse of said one polarity, rejection circuit means at each field station operative in response to certain successive periods of energization and deenergization during a code cycle to reverse the polar connection of its respective polar line relay to the line circuit to render its respective polar line relay unresponsive to subsequent periods of energization of the line circuit during said cycle, said cycle including a clear out period of deenergization of said line circuit at the end thereof, means at the control office effective to momentarily energize said line circuit with voltage of opposite polarity during a portion of said clear-out period to energize each polar line relay having a reverse connection, and circuit means at each of said field stations responsive to the energizing of its associateed reverse connected polar line relay during said clear-out period effective to reconnect said polar line relays to said line circuit to be responsive to subsequent impulses of current of said one polarity.

3. In a centralized traffic control system for railroads, a line circuit extending between a control office and a plurality of field stations, code transmitting means at said control office for energizing and deenergizing said line circuit with voltage of one polarity successively a predetermined number of times to form a control cycle, said control cycle including a single clear-out period of deenergization at the end thereof, a field line polar relay at each field station connected in parallel across said line circuit and having contacts in one position when the line circuit is energized, control code receiving means at each field station responsive to certain distinct periods of energization and deenergization during said control cycle effective to render certain ones of said polar line relays operative in response to energy of opposite polarity only on said line circuit, the contacts of said certain polar line relays remaining in their other position during said cycle, means at said control office effective to momentarily energize said line circuit with voltage of opposite polarity during said clear-out period to shift the contacts of said certain polar line relays momentarily to said one position, and means at each field station responsive to the momentary shifting of the contacts of said certain polar line relays to said one position during said clear-out period to thereafter render said polar relays responsive to line voltage of said one polarity.

4. In a centralized traffic control system for railroads, a line circuit extending between a control office and a plurality of field stations, code transmitting means at the control office for energizing said line circuit with successive time-spaced impulses of one polarity, a polar line relay at each field station for repeating the impulses of said one polarity, code receiving circuit means at each field station responsive to the operation of its associated polar line relay for selecting one of said field stations to respond to a complete cycle of impulses, rejection circuit means governed by said code circuit means effective to pole change the connections to the windings of all said polar line relays except at said selected one field station to render said polar line relays unresponsive to subsequent impulses of said line circuit, means at the control office effective to pole change said line circuit after a selected one of said impulses to operate said rejected polar relays, and means responsive to the operation of said rejected polar relays to disconnect said rejection circuit means to thereafter cause said polar line relays to repeat the impulses of said one polarity.

5. In a centralized traffic control system for railroads, a line circuit extending between a control office and a plurality of field stations, code transmitting means at said control office for evolving successive periods of energization and deenergization of the line circuit with current of one polarity, a polar line relay at each field station connected in parallel across said line circuit and being operative normally in response to voltage of said one polarity, said successive periods of energization comprising a control cycle, including field station rejection means during the first part of said cycle and a clear-out period of deenergization at the end of said cycle, circuit selection means at each field station responsive to the operation of its associated polar line relay in accordance with the code transmitting means for selecting a predetermined field station during said first part of the control cycle, circuit rejection means responsive to the operation of its respective polar line relay in discordance with the code transmitted for rejecting all other field stations, a magnetic stick reverse connection relay at each field station, means responsive to said circuit rejection means to operate said reverse connection relay to one position at each rejected field station, said reverse connection relay being effective in said one position to render each associated polar line relay unresponsive to the periods of energization during the remainder of the control cycle, a pole changing relay at said control office effective to energize said line circuit momentarily during said clear-out period to operate said rejected polar line relays, and means responsive to the operation of said rejected polar line relays during said clear-out period effective to operate the associated reverse connection magnetic stick relay to its other position.

6. In a centralized traffic control system for railroads, a line circuit extending between a control office and a plurality of field stations, circuit means at said control office for energizing and deenergizing said line circuit with direct voltage of one polarity successively a predetermined number of times to form a control cycle, said control cycle including a clear-out period of line circuit deenergization at the end thereof, a pole changing relay at said control office, a polar line relay at each field station connected in parallel across said line circuit and having contacts in one position when said line circuit is energized, a magnetic stick rejection relay at each field station having a pick up winding and a knock down winding, control code receiving means at each field station responsive to certain distinct periods of energization and deenergization of said line circuit during each cycle for energizing the pick-up winding of certain ones of said magnetic stick rejection relays, circuit means responsive to the picking up of said magnetic stick relays effective to render its associated polar line relay operative only in response to energy of opposite polarity on said line circuit, circuit means at said control office including said pole changing relay effective to energize said line circuit momentarily with voltage of opposite polarity during said clear-out period to operate the contacts of said rejected polar line relays to said one position, and circuit means at each of said field stations effective to energize said knock down winding of each operated magnetic stick relay upon the operation of the contacts of polar line relays to said one position during said clear-out period to render said polar relays responsive to the line circuit energized with voltage of said one polarity.

7. In a code communication system, a normally energized line circuit extending from a control office to a plurality of remote field stations, code transmitting apparatus including a source of direct current energy for successively deenergizing and energizing said line circuit with different periods of time-spaced impulses to form an operating cycle, code receiving apparatus and a source of direct current energy at each field station effective to operate said code receiving apparatus during an operating cycle, magnetically retained relay means at each field station effective to disconnect said direct current energy source from said code receiving apparatus at the end of a code cycle when the line circuit is normally energized.

8. In a centralized traffic control system for railroads, a line circuit extending between a control office and a field station, pulsing means at the control office for energizing and deenergizing said line circuit a predetermined number of times to form an operating cycle, a polar line relay at said field station connected across said line circuit, circuit means at said control office effective to hold said line circuit energized between each operating cycle, a plurality of coding relays at said field station, a source of energy at said field station, circuit means including said source of energy effective to operate said coding relays in response to the successive operations of said polar line relay during an operating cycle, an energy removal magnetic stick rest relay, circuit means responsive to the energizing of said polar relay at the end of a cycle for energizing said energy removal rest relay, and circuit means including contacts of said energy removal rest relay in its picked up condition for disconnecting said source of energy from said coding relays when said line circuit is normally energized between each operating cycle.

9. In a centralized traffic control system for railroads, a line circuit extending between a control office and a plurality of field stations, code transmitting means at the control office for energizing and deenergizing said line circuit to form a cycle of different periods of time-spaced impulses, said cycle including a conditioning period of deenergizing of the line circuit at the start thereof and a clear-out period of deenergization at the end thereof, means at the control office for maintaining said line circuit energized when said code transmitting means is at rest, a polar line relay at each field station connected in parallel across said line circuit and deenergized by said code transmitting means at the start of each cycle and energized at the end of each cycle, a normally deenergized field rest relay at each field station, a source of energy at each field station, a plurality of coding relays operated in a predetermined sequence during said cycle by said source of energy upon the deenergizing of said field rest relay, means responsive to the deenergizing of the polar line relay to connect said source of energy to said field rest relay to energize said relay at the beginning of a cycle, circuit means responsive to the operation of certain of said coding relays effective to thereafter deenergize said field rest relay during said conditioning period, circuit means responsive to the operation of certain of said coding relays for energizing said field rest relay after the clearout period of said cycle, and means responsive to the deenergizing of said coding relays after said clear-out period to disconnect said source of energy from said field rest relay.

10. In a centralized traffic control system for railroads, a normally energized line circuit extending between a control office and remote field stations, means at said control office for successively deenergizing said line circuit a predetermined number of times according to a time-spaced code to form a control cycle, a polar line relay at said field stations connected in parallel across said line circuit and having contacts in one position when the line circuit is normally energized, a source of energy at each field station, a plurality of communication relays at each field station, circuit means at said field station effective upon the operation of the contacts of said polar line relay to their other position to sequentially connect said communication relays to the source of energy, a magnetic stick energy removal relay at said field station, circuit means effective to operate said energy removal relay at the end of a cycle when said polar line relay is in said one position to disconnect said source of energy from said communication relays.

11. In a centralized traffic control system for railroads of the type wherein a normally energized line circuit connects a control office with a plurality of field stations and means are provided at the control office to apply a series of time-spaced impulses to said line circuit to constitute a control code cycle, the first time-spaced period being one of prolonged deenergization of said line circuit, a two-position polar line relay at each field station connected in parallel across said line circuit to be deenergized and energized by said line circuit during a cycle, a source of energy at each field station, normally deenergized timing relay means at each field station, a normally deenergized slow release relay at each field station operative to cooperate with said timing relay means to provide said prolonged period, circuit means at each field station including its associated source of energy and its associated polar line relay effective to energize said slow release relay upon the deenergizing of said polar line relay, circuit means effective to energize said timing relay means upon the energizing of said slow release relay, and means effective upon the energizing of said timing relay means to release said slow release relay to commence the timing of said prolonged period, whereby the release time of said slow release relay in said prolonged period is operative to condition the code cycle yet said slow release relay is normally disconnected from said associated source of energy while said line circuit is normally energized.

12. In a centralized traffic control system for railroads of the type wherein a normally energized line circuit connects a control office with a plurality of field stations and means are provided at the control office to receive a series of time-spaced impulses that are transmitted by a field station to constitute an indication code cycle, a two-position polar line relay at each field station connected in parallel across said line circuit and normally energized by said line circuit, said indication cycle including a conditioning period, a normally deenergized slow release relay, the release time of which determines said conditioning period, a source of energy at each field station, a magnetic stick energy removal relay at each field station, a normally energized indication code initiating relay at each field station, circuit means responsive to the deenergizing of the code initiating means at a transmitting station effective to cause its associated energy removal relay to connect its slow release relay to said source of energy, and circuit means responsive to the operation of the energy removal relay to operate its associated polar line relay to the deenergized position, and means responsive to the deenergizing of the polar line relay to release said slow release relay to commence the conditioning period of the cycle for said transmitting station.

13. In a centralized traffic control system according to claim 12, having a second magnetic stick relay, circuit means responsive to a period of prolonged deenergization of its associated polar line relay to operating said second magnetic stick relay, and means responsive to the operation of said second magnetic stick relay for disconnecting the coding relays from said source of energy.

14. In a centralized traffic control system for railroads, a line circuit connecting a control office to a plurality of remote field stations, a polar line relay at each field station connected in parallel across said line circuit, indication code transmitting means at each field station effective upon a change in traffic conditions at a respective station to intermittently shunt said line circuit successively a predetermined number of times to transmit an indication code cycle from a field station and to intermittently operate said polar relays at all field stations, a source of energy at each field station, coding relays at each field station having circuit means including said source of energy to be operated upon the operation of their associated polar line relays at the beginning of an indication cycle, means effective to maintain each polar line relay at each non-transmitting field station unresponsive to the shunting of the line circuit, and means governed by each unresponsive polar line relay at said non-transmitting field stations to disconnect said coding relays from said source of energy.

15. In a centralized traffic control system for railroads, a line circuit connecting a control office to a plurality of field stations, a polar line relay at each field station connected in parallel across said line circuit and having a contact biased toward one position when deenergized, means at the control office for normally energizing said line circuit with current of one polarity effective to hold said polar contacts in their other position, indication transmitting means at each field station effective upon a change in traffic conditions at a respective station to intermittently shunt said line circuit successively a predetermined number of times to transmit an indication code cycle, means responsive to the initiation of an indication code cycle for shifting the contact of said polar line relays to their said one biased position, a source of energy at each field station, coding relays at each field station having circuit means including said source of energy operated in predetermined sequence in response to the intermittent operation of their responsive polar relays, means at each non-transmitting field station to render the associated polar relays unresponsive to subsequent periods of shunting during said indication cycle, and energy removal means governed by the unresponding polar line relays to disconnect said source of energy from said coding relays.

16. In a code communication system, a line circuit connecting a control office with a plurality of field stations, a field line relay connected across the line circuit at each field station, said line relay being responsive to electrical energy of one characteristic applied to said line relay over said line circuit, code transmitting means at the control office for energizing said line circuit periodically a predetermined number of times with energy of said distinctive characteristic in accordance with a particular code to operate each line relay in accordance therewith, means at certain field stations responsive to a plurality of operations of its associated line relay in accordance with the code transmitted to render its field line relay at said certain field stations unresponsive to further periodic energization of the line circuit with electrical energy of said one characteristic but responsive to energy of another characteristic, means at the control office effective to energize the line circuit with energy of said other characteristic after a predetermined number of energizations by energy of said one characteristic, and circuit means responsive to the operation of each line relay by energy of said other characteristic effective to render the respective line relay responsive to energy of said one characteristic.

References Cited in the file of this patent
UNITED STATES PATENTS

| | | |
|---|---|---|
| 2,216,211 | Preston | Aug. 9, 1938 |
| 2,399,734 | Hailes et al. | May 7, 1946 |
| 2,965,882 | Jackel | Dec. 20, 1960 |